(12) United States Patent
Liu et al.

(10) Patent No.: US 10,813,081 B2
(45) Date of Patent: Oct. 20, 2020

(54) REFERENCE SIGNAL CONFIGURATION METHOD AND DEVICE

(71) Applicant: HUAWEI TECHNOLOGIES CO., LTD., Shenzhen (CN)

(72) Inventors: Jin Liu, Shenzhen (CN); Haicun Hang, Shanghai (CN); Xiaoyan Bi, Shanghai (CN); Dageng Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 75 days.

(21) Appl. No.: 16/034,366

(22) Filed: Jul. 13, 2018

(65) Prior Publication Data
US 2018/0332572 A1    Nov. 15, 2018

Related U.S. Application Data

(63) Continuation of application No. PCT/CN2016/106548, filed on Nov. 18, 2016.

(30) Foreign Application Priority Data

Jan. 13, 2016  (CN) .......................... 2016 1 0022482

(51) Int. Cl.
*H04W 72/04*    (2009.01)
*H04W 72/12*    (2009.01)
(Continued)

(52) U.S. Cl.
CPC ...... *H04W 72/0406* (2013.01); *H04B 7/0452* (2013.01); *H04L 5/0023* (2013.01);
(Continued)

(58) Field of Classification Search
CPC . H04W 72/0406; H04W 72/12; H04W 72/04; H04W 72/1278; H04W 72/0453;
(Continued)

(56) References Cited

U.S. PATENT DOCUMENTS

2010/0309870 A1*  12/2010  Wengerter .......... H04W 72/042
                                                            370/329
2012/0300709 A1    11/2012  Su et al.
(Continued)

FOREIGN PATENT DOCUMENTS

CN    102088429 A    6/2011
CN    102149082 A    8/2011
(Continued)

OTHER PUBLICATIONS

XP050449687 R1-104330 CATT,"Transmission mode and control signaling for DL-MIMO in Rel-10",3GPP TSG RAN WG1 Meeting #62 ,Madrid, Spain, Aug. 23-27, 2010,total 4 pages.
(Continued)

*Primary Examiner* — Lan-Huong Truong
(74) *Attorney, Agent, or Firm* — Kilpatrick Townsend & Stockton LLP

(57) ABSTRACT

According to embodiments of the present invention, a quantity of available state values of a reference signal configuration is increased by indicating a dual-codeword transmission mode and two single-codeword transmission modes, where the two single-codeword transmission modes are distinguished by using a new data indicator NDI. Therefore, higher-rank (such as 16-layer or 24-layer) MU-MIMO can be supported, increasing system spectral efficiency significantly, and improving MU-MIMO configuration flexibility and resource scheduling effectiveness.

16 Claims, 2 Drawing Sheets

| ... | DMRS configuration parameter field | $MCS_1$ | $NDI_1$ | $RV_1$ | $MCS_2$ | $NDI_2$ | $RV_2$ | ... |
|---|---|---|---|---|---|---|---|---|
| | 4 bits | 5 bits | 1 bit | 2 bits | 5 bits | 1 bit | 2 bits | |

(51) Int. Cl.
*H04L 5/00* (2006.01)
*H04B 7/0452* (2017.01)

(52) U.S. Cl.
CPC .......... *H04L 5/0051* (2013.01); *H04L 5/0053* (2013.01); *H04W 72/04* (2013.01); *H04W 72/12* (2013.01); *H04L 5/0016* (2013.01); *H04L 5/0017* (2013.01); *H04L 5/0092* (2013.01)

(58) Field of Classification Search
CPC ... H04L 5/0053; H04L 5/0017; H04L 5/0051; H04L 5/0023; H04L 5/0092; H04B 7/0452
See application file for complete search history.

(56) References Cited

U.S. PATENT DOCUMENTS

| | | | |
|---|---|---|---|
| 2012/0307768 A1 | 12/2012 | Xu et al. | |
| 2013/0242853 A1* | 9/2013 | Seo | H04L 5/0023 370/315 |
| 2014/0056269 A1* | 2/2014 | Zhang | H04B 7/0689 370/329 |
| 2014/0293881 A1* | 10/2014 | Khoshnevis | H04L 5/0046 370/329 |
| 2015/0208392 A1* | 7/2015 | Park | H04B 7/024 370/329 |
| 2015/0373737 A1* | 12/2015 | Park | H04L 1/16 370/329 |
| 2016/0065345 A1* | 3/2016 | Kim | H04W 72/0406 370/330 |

FOREIGN PATENT DOCUMENTS

| | | |
|---|---|---|
| CN | 102447524 A | 5/2012 |
| CN | 102158302 B | 9/2013 |
| CN | 103841644 A | 6/2014 |
| EP | 2528244 A2 | 11/2012 |
| EP | 2648448 A1 | 10/2013 |

OTHER PUBLICATIONS

XP051003189 R1-156830 ZTE," Signaling Details of DMRS Enhancement for FD-MIMO",3GPP TSG RAN WG1 Meeting #83,Anaheim, USA, Nov. 15-22, 2015,total 6 pages.

XP051003230 R1-156874 LG Electronics,"Remaining details on DMRS enhancements",3GPP TSG RAN WG1 Meeting #83,Anaheim, USA, Nov. 15-21, 2015,total 3 pages.

XP051042275 R1-157906 Samsung,"RAN1#83 agreements for Rel. 13 EB/FD-MIMO",3GPP TSG RAN WG1 Meeting #82bis,Malmö, Sweden, Oct. 5-9, 2015,total 5 pages.

* cited by examiner

REFERENCE SIGNAL CONFIGURATION METHOD AND DEVICE

CROSS-REFERENCE TO RELATED APPLICATIONS

This application is a continuation of International Application No. PCT/CN2016/106458, filed on Nov. 18, 2016, which claims priority to Chinese Patent Application No. 201610022482.X, filed on Jan. 13, 2016, The disclosures of the aforementioned applications are hereby incorporated by reference in their entireties.

TECHNICAL FIELD

The present invention relates the field of communications technologies, and in particular, to a reference signal configuration method and device.

BACKGROUND

In a Long Term Evolution (LTE) system, to support spatial multiplexing of multi-layer data streams in a multiple-input multiple-output (MIMO) technology, demodulation reference signals (DMRS or DM-RS) corresponding to the data streams need to be orthogonal or semi-orthogonal, to avoid interference between the data streams. For example, frequency division multiplexing and an orthogonal cover code (OCC) are used to implement completely orthogonal DMRSs for multiple DMRSs corresponding to multi-layer data streams of a single user. Further, different pseudorandom sequences are used to implement interference randomization between DMRSs corresponding to multiple users.

FIG. 1 is a schematic structural diagram of a DMRS used in an existing LTE system. As shown in FIG. 1, a physical resource block pair (PRB pair) includes 24 DMRS symbols. DMRS symbols of antenna ports 7, 8, 11, and 13 belong to one group, DMRS symbols of antenna ports 9, 10, 12, and 14 belong to another group, and the two groups of DMRS symbols are ensured to be orthogonal by means of frequency division multiplexing. Further, DMRS symbols of different antenna ports in each group occupy a same time-frequency resource, and the DMRS symbols are made orthogonal to each other by using an OCC. It can be learned that a maximum of eight orthogonal demodulation reference signals are supported in the DMRS structure (that is, when the DMRS symbols of the antenna ports 7, 8, 11, 12, 9, 10, 13, and 14 are all orthogonal to each other, eight orthogonal demodulation reference signals can be supported). A quantity of data transmission layers of each user and corresponding DMRS resources need to be flexibly configured by using downlink dynamic control signaling.

Introduction of a massive MIMO technology makes high-rank spatial multiplexing of data streams possible. Specifically, in LTE or LTE-Advanced Release-10-12 (R10-12), both downlink transmission modes (TM) 9 and 10 support single-user multiple-input multiple-output (SU-MIMO) transmission of up to eight layers and multi-user multiple-input multiple-output (MU-MIMO) transmission of up to four layers, and dynamic switching between the SU-MIMO and the MU-MIMO can be implemented in a same transmission mode.

Downlink control information (DCI) format 2C and format 2D respectively corresponding to the TM9 and the TM10 include a 3-bit DMRS configuration field each. The DMRS configuration field indicates parameters for sending from a system to user equipment, including a quantity of transmission layers, a transmit antenna port, and a scrambling identity (SCID). In the DCI format 2C and format 2D corresponding to the TM9 and the TM10, orthogonal demodulation reference signal configuration is used for a plurality of SU-MIMO data streams, MU-MIMO data streams usually have relatively good spatial orthogonality, and interference can be randomized between demodulation reference signals by using different pseudorandom sequences (that is, different scrambling identities).

Table 1 is a schematic table of DMRS configurations in R12. As listed in Table 1, a DMRS configuration field in R12 is 3 bits long, and may be corresponding to eight state values that indicate different configurations in single-codeword transmission and dual-codeword transmission. Different values of $n_{SCID}$ represent different initial values of a generated pseudorandom sequence.

TABLE 1

Schematic table of DMRS configurations in R12

| Single-codeword transmission | | Dual-codeword transmission | |
| --- | --- | --- | --- |
| State value | Meaning | State value | Meaning |
| 0 | 1 layer, antenna port 7, $n_{SCID}$ = 0 | 0 | 2 layers, antenna ports 7 and 8, $n_{SCID}$ = 0 (OCC = 2) |
| 1 | 1 layer, antenna port 7, $n_{SCID}$ = 1 | 1 | 2 layers, antenna ports 7 and 8, $n_{SCID}$ = 1 (OCC = 2) |
| 2 | 1 layer, antenna port 8, $n_{SCID}$ = 0 | 2 | 3 layers, antenna ports 7 to 9 |
| 3 | 1 layer, antenna port 8, $n_{SCID}$ = 1 | 3 | 4 layers, antenna ports 7 to 10 |
| 4 | 2 layers, antenna ports 7 and 8 | 4 | 5 layers, antenna ports 7 to 11 |
| 5 | 3 layers, antenna ports 7 to 9 | 5 | 6 layers, antenna ports 7 to 12 |
| 6 | 4 layers, antenna ports 7 to 10 | 6 | 7 layers, antenna ports 7 to 13 |
| 7 | Reserved | 7 | 8 layers, antenna ports 7 to 14 |

For single-codeword transmission, state values 0 to 3 of the DMRS configuration may indicate that spatial multiplexing can be configured for a maximum of four single-stream users in a system, and 1-layer transmission is supported for each user. An antenna port 7 and an antenna port 8 are made orthogonal to each other by using an OCC that is 2 bits long. A same antenna port (for example, the antenna port 7 corresponding to state values 0 and 1) uses different pseudorandom sequences (that is, $n_{SCID}$=0 and $n_{SCID}$=1, indicating two pseudorandom sequences with different initial values) to implement interference randomization between different layers. State values 4 to 6 of the DMRS configuration may indicate data retransmitted by a user. If a codeword is incorrectly decoded in dual-codeword multi-layer transmission of the user, only the incorrect codeword is retransmitted, and a transmission layer quantity to which the codeword is mapped remains unchanged.

For dual-codeword transmission, state values 0 and 1 of the DMRS configuration may indicate that spatial multiplexing can be configured for a maximum of two dual-stream users in a system, and 2-layer transmission is supported for each user. An antenna port 7 or 8 is configured for 2-layer transmission of each user, to ensure orthogonality of DMRSs, while different scrambling identities are configured for DMRSs between two users to randomize interference. State values 2 to 7 of the DMRS configuration may indicate SU-MIMO transmission. For example, the state value 7 may indicate transmission of up to eight layers, and antenna ports 7 to 14 are configured to ensure orthogonality between DMRSs of the eight layers.

For the MU-MIMO, the DMRS configurations in Table 1 support transmission of only four layers at maximum. Introduction of the massive MIMO technology makes higher-rank MIMO possible. Apparently, such DMRS configurations cannot meet the requirement.

A full-dimension MIMO (FD-MIMO) technology is introduced in LTE/LTE-Advanced Release-13 (R13), increasing a maximum quantity of layers supported by the MU-MIMO from 4 to 8.

Table 2 is a schematic table of DMRS configurations in R13. As listed in Table 2, based on state values of an original release, 8-layer MU-MIMO configurations (as shown by state values 4 to 11 for single-codeword transmission and state values 2 to 5 for dual-codeword transmission) are directly added to the DMRS configurations in R13. Because there are more state values, a length of the DMRS configuration field in the DCI format 2C/2D is increased from 3 bits to 4 bits.

TABLE 2

Schematic table of DMRS configurations in R13

| Single-codeword transmission | | Dual-codeword transmission | |
|---|---|---|---|
| State value | Meaning | State value | Meaning |
| 0 | 1 layer, antenna port 7, $n_{SCID} = 0$ (OCC = 2) | 0 | 2 layers, antenna ports 7 and 8, $n_{SCID} = 0$ (OCC = 2) |
| 1 | 1 layer, antenna port 7, $n_{SCID} = 1$ (OCC = 2) | 1 | 2 layers, antenna ports 7 and 8, $n_{SCID} = 1$ (OCC = 2) |
| 2 | 1 layer, antenna port 8, $n_{SCID} = 0$ (OCC = 2) | 2 | 2 layers, antenna ports 7 and 8, $n_{SCID} = 0$ (OCC = 4) |
| 3 | 1 layer, antenna port 8, $n_{SCID} = 1$ (OCC = 2) | 3 | 2 layers, antenna ports 7 and 8, $n_{SCID} = 1$ (OCC = 4) |
| 4 | 1 layer, antenna port 7, $n_{SCID} = 0$ (OCC = 2) | 4 | 2 layers, antenna ports 11 and 13, $n_{SCID} = 0$ (OCC = 4) |
| 5 | 1 layer, antenna port 7, $n_{SCID} = 1$ (OCC = 4) | 5 | 2 layers, antenna ports 11 and 13, $n_{SCID} = 1$ (OCC = 4) |
| 6 | 1 layer, antenna port 8, $n_{SCID} = 0$ (OCC = 4) | 6 | 3 layers, antenna ports 7 to 9 |
| 7 | 1 layer, antenna port 8, $n_{SCID} = 1$ (OCC = 4) | 7 | 4 layers, antenna ports 7 to 10 |
| 8 | 1 layer, antenna port 11, $n_{SCID} = 0$ (OCC = 4) | 8 | 5 layers, antenna ports 7 to 11 |
| 9 | 1 layer, antenna port 11, $n_{SCID} = 1$ (OCC = 4) | 9 | 6 layers, antenna ports 7 to 12 |
| 10 | 1 layer, antenna port 13, $n_{SCID} = 0$ (OCC = 4) | 10 | 7 layers, antenna ports 7 to 13 |
| 11 | 1 layer, antenna port 13, $n_{SCID} = 1$ (OCC = 4) | 11 | 8 layers, antenna ports 7 to 14 |
| 12 | 2 layers, antenna ports 7 and 8 | 12 | |
| 13 | 3 layers, antenna ports 7 to 9 | 13 | |
| 14 | 4 layers, antenna ports 7 to 10 | 14 | |
| 15 | | 15 | |

Specifically, for the single-codeword transmission, compared with Table 1, state values 4 to 11 of the DMRS configuration are added to Table 2 to indicate that spatial multiplexing can be configured for a maximum of eight single-stream users in a system, that is, only 1-layer transmission is supported for each user. Similarly, a 4-bit OCC is used to provide code-division orthogonality for DMRSs of antenna ports 7, 8, 11, and 13, and different pseudorandom sequences ($n_{SCID}=0$ and $n_{SCID}=1$) are used to randomize interference between DMRSs that are at different layers but occupy a same antenna port.

For the dual-codeword transmission, compared with Table 1, state values 2 to 5 of the DMRS configuration are added to Table 2 to indicate that spatial multiplexing can be configured for a maximum of four dual-stream users in the system, and 2-layer transmission can be supported for each user. Similarly, orthogonal DMRSs are used for multi-stream transmission of each user, and different pseudorandom sequences can be used to randomize interference between users.

In Table 2, higher-rank data stream transmission is supported by directly increasing a length of the DMRS configuration field (that is, 1-bit indication information is added). However, because downlink control signaling requires high reliability, has high coding redundancy, and relies on blind detection, the method of directly increasing the length of the DMRS configuration field brings relatively high system overheads and increases detection complexity.

SUMMARY

Embodiments of the present invention provide a reference signal configuration method and device, to increase a quantity of available state values of a reference signal configuration by indicating a dual-codeword transmission mode and two single-codeword transmission modes, where the two single-codeword transmission modes are distinguished by using a new data indicator NDI. To achieve the foregoing objective, the embodiments of the present invention use the following technical solutions.

According to a first aspect, an embodiment of the present invention provides a reference signal configuration method, including:

generating control signaling carrying configuration information of a reference signal, where the configuration information of the reference signal includes a configuration mode field, the configuration mode field is used to indicate a reference signal configuration mode, and the configuration mode is one of the following two configuration modes: a first single-codeword transmission mode or a second single-codeword transmission mode; and sending the control signaling.

Further, the reference signal configuration method further includes: sending radio resource control signaling, where the radio resource control signaling carries configuration result indication information, and the configuration result indication information is used to indicate that a current reference signal configuration manner switches between a plurality of configuration results.

According to a second aspect, an embodiment of the present invention provides a reference signal configuration method, including:

receiving control signaling carrying configuration information of a reference signal, where the configuration information of the reference signal includes a configuration mode field, the configuration mode field is used to indicate a reference signal configuration mode, and the configuration mode is one of the following two configuration modes: a first single-codeword transmission mode or a second single-codeword transmission mode; and processing the control signaling.

According to a third aspect, an embodiment of the present invention provides a reference signal configuration device, including: a processor, a transmitter, and a bus, where the processor and the transmitter are connected by using the bus, to perform data transmission;

the processor is configured to generate control signaling carrying configuration information of a reference signal, where the configuration information of the reference signal includes a configuration mode field, the configuration mode field is used to indicate a reference signal configuration mode, and the configuration mode is one of the following two configuration modes: a first single-codeword transmission mode or a second single-codeword transmission mode; and the transmitter is configured to send the control signaling.

According to a fourth aspect, an embodiment of the present invention provides a reference signal configuration device, including: a processor, a receiver, and a bus, where the processor and the receiver are connected by using the bus, to perform data transmission;

the receiver is configured to receive control signaling carrying configuration information of a reference signal, where the configuration information of the reference signal includes a configuration mode field, the configuration mode field is used to indicate a reference signal configuration mode, and the configuration mode is one of the following two configuration modes: a first single-codeword transmission mode or a second single-codeword transmission mode; and the processor is configured to process the control signaling.

Further descriptions are given below in the embodiments of the present invention with reference to the first aspect, the second aspect, the third aspect, or the fourth aspect.

Optionally, the configuration mode field includes at least one of a first new data indicator NDI or a second NDI, where the first NDI is used to distinguish between the first single-codeword transmission mode and the second single-codeword transmission mode; or the second NDI is used to distinguish between the first single-codeword transmission mode and the second single-codeword transmission mode.

Optionally, the configuration information of the reference signal further includes a configuration parameter field; the configuration parameter field is used to indicate a state value of the reference signal; and the state value of the reference signal is corresponding to at least one of a data transmission layer quantity, an antenna port, or a scrambling identity of the reference signal.

Optionally, a configuration corresponding to the state value implements orthogonal reference signals between multiple layers of a single user and achieves interference randomization between reference signals of multiple users.

In the embodiments of the present invention, a quantity of available state values of the reference signal configuration is increased by indicating a dual-codeword transmission mode and two single-codeword transmission modes, where the two single-codeword transmission modes are distinguished by using the new data indicator NDI. Therefore, higher-rank (such as 16-layer or 24-layer) MU-MIMO can be supported, increasing system spectral efficiency significantly, and improving MU-MIMO configuration flexibility and resource scheduling effectiveness.

BRIEF DESCRIPTION OF DRAWINGS

Accompanying drawings are included in this specification and constitute a part of this specification, where same numbers in this specification describe a same element. The accompanying drawings show embodiments of the present invention, and explain principles of the present invention together with this specification.

DESCRIPTION OF EMBODIMENTS

The following describes in detail the embodiments of the present invention, and examples of the embodiments are shown in accompanying drawings. Although descriptions are made with reference to these embodiments, it should be understood that these descriptions are not used to limit the present invention to these embodiments. Instead, the disclosure of the present invention is intended to cover the alternative technologies, modifications, and equivalent technologies that may fall within the spirit and scope of the present invention defined by the appended claims. In addition, in the following detailed descriptions of the present invention, many specific details are explained to facilitate thorough understanding of the present invention. However, it should be understood that, in practical application, these specific details may not be included. In other embodiments, detailed descriptions of well-known methods, processes, components, and circuits are omitted to avoid unnecessary ambiguity of various aspects of the present invention.

Figure 1:
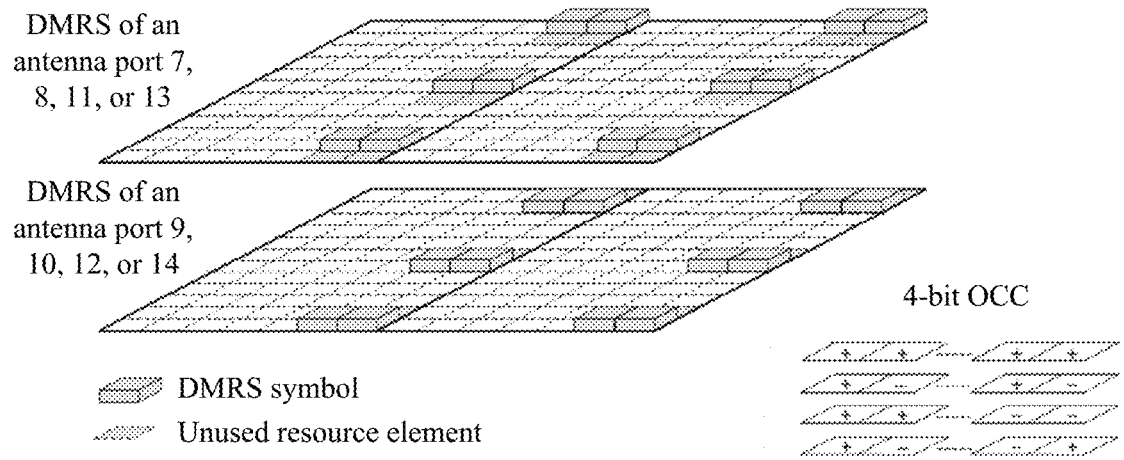
FIG. 1 is a schematic structural diagram of a DMRS used in an existing LTE system.
Figure 2:
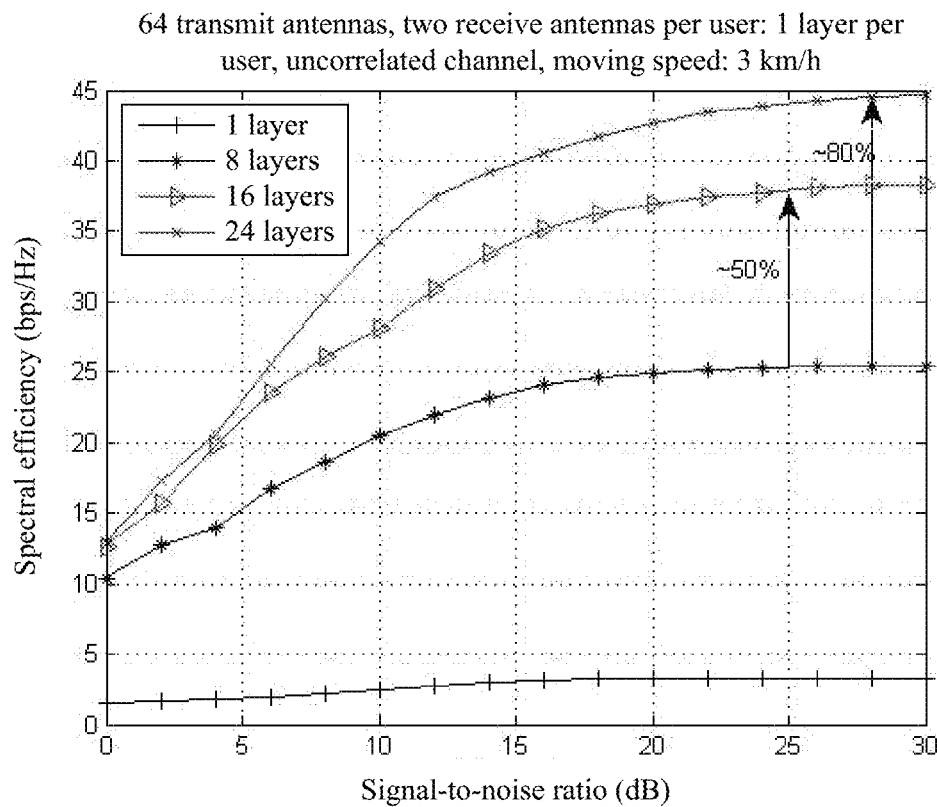
FIG. 2 is a simulation diagram of throughput performance evaluation of massive MIMO.

FIG. 2 is a simulation diagram of throughput performance evaluation of massive MIMO. It can be learned from FIG. 2 that performance of 16-layer MU-MIMO is improved by 50% compared with performance of 8-layer MU-MIMO. Therefore, introduction of a massive MIMO technology requires support of higher-rank MU-MIMO. However, DMRS configurations in Table 2 cannot support an MU-MIMO configuration of more than eight layers. If a new 16-layer MU-MIMO configuration is directly added based on existing state values, a length of a DMRS configuration field is increased from 4 bits to 5 bits. This not only brings additional signaling overheads, but also causes a length of a DMRS configuration field of a DCI format 2C in a later release to be the same as that of a DMRS configuration field of a DCI format 2D in R12, because a length of the DCI format 2D in R12 is exactly 2 bits longer than that of a DCI format 2C in R12. It is known that a system distinguishes between different DCI formats by detecting signaling lengths. A user cannot distinguish between the DCI format 2C in the later release and the DCI format 2D of R12 if the DMRS configuration fields of the DCI formats 2C in the later release is 5 bits long.

Figure 3:
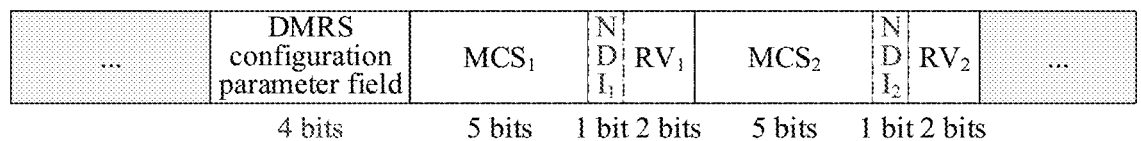
FIG. 3 is a schematic diagram of a type of DCI signaling according to an embodiment of the present invention.

FIG. 3 is a schematic DCI signaling diagram according to an embodiment of the present invention. As shown in FIG. 3, DCI signaling includes a DMRS configuration parameter field (4 bits), an MCS1 (5 bits), an NDI1 (1 bit), a RV1 (2 bits), an MCS2 (5 bits), an NDI2 (1 bit), and a RV2 (2 bits). The MCS1 and the MCS2 represent modulation and coding schemes (English: Modulation and Coding Scheme), NDI represents a new data indicator (NDI), and the RV1 and the RV2 represent redundancy versions. The NDI is used to indicate that to-be-transmitted data is new data or data that needs to be retransmitted. When the NDI is inverted (that is, changes from 0 to 1 or from 1 to 0), it indicates that the to-be-transmitted data is new data. When the NDI is not inverted, it indicates that the to-be-transmitted data is data that needs to be retransmitted or there is no new data to be sent. For ease of description, the following uses NDI=1 to indicate that the NDI is inverted, and uses NDI=0 to indicate that the NDI is not inverted.

Configurations MCS2=0 and RV2=1 (a decimal value) indicate that current transmission is single-codeword transmission, that is, a codeword 0 is in an enable state (related parameters of the codeword 0 are indicated by using the MCS1 and the RV1), and a codeword 1 is in a disable state. Further, whether the current transmission is new-data transmission or retransmission can be determined by identifying an NDI corresponding to the codeword 0. Most other state values of the MCS2 and the RV2 are used to indicate dual-codeword transmission, that is, the codeword 0 is in an enable state (the related parameters of the codeword 0 are indicated by using the MCS1 and the RV1), and the codeword 1 is also in an enable state (the related parameters of the codeword 1 are indicated by using the MCS2 and the RV2).

In the present invention, it is considered to use an existing new data indicator NDI in control signaling, to support higher-rank MU-MIMO transmission (such as 16-layer MU-MIMO) without bringing additional signaling overheads. Specifically, for single-codeword transmission, the NDI1 may be used to classify state values of the DMRS configuration according to scenarios of new-data transmission and retransmission, as shown in FIG. 3. That is, for single-codeword transmission, by classifying the state values of the DMRS configuration according to the scenarios of new-data transmission and retransmission, a quantity of state values of the DMRS configuration can be increased (for example, a quantity of state values for single-codeword transmission in R13 may be increased from 15 to 32). Optionally, for single-codeword transmission, the codeword 1 is in the disable state, and the NDI2 is unused. Therefore, the quantity of state values of the DMRS configuration can be doubled by using the NDI2. Therefore, two reference signal configuration tables for single-codeword transmission according to the present invention are as follows:

TABLE 3

First type of DMRS configuration table for single-codeword transmission

| Single-codeword transmission for new-data transmission (MCS2 = 0, RV2 = 1, NDI1 = 1) | | Single-codeword transmission for retransmission (MCS2 = 0, RV2 = 1, NDI1 = 0) | |
| --- | --- | --- | --- |
| State value | Meaning | State value | Meaning |
| 0 | 1 layer, antenna port 7, $n_{SCID} = 0$ (OCC = 4) | 0 | 1 layer, antenna port 7, $n_{SCID} = 0$ (OCC = 4) |
| 1 | 1 layer, antenna port 7, $n_{SCID} = 1$ (OCC = 4) | 1 | 1 layer, antenna port 7, $n_{SCID} = 1$ (OCC = 4) |
| 2 | 1 layer, antenna port 8, $n_{SCID} = 0$ (OCC = 4) | 2 | 1 layer, antenna port 8, $n_{SCID} = 0$ (OCC = 4) |
| 3 | 1 layer, antenna port 8, $n_{SCID} = 1$ (OCC = 4) | 3 | 1 layer, antenna port 8, $n_{SCID} = 1$ (OCC = 4) |
| 4 | 1 layer, antenna port 11, $n_{SCID} = 0$ (OCC = 4) | 4 | 1 layer, antenna port 11, $n_{SCID} = 0$ (OCC = 4) |
| 5 | 1 layer, antenna port 11, $n_{SCID} = 1$ (OCC = 4) | 5 | 1 layer, antenna port 11, $n_{SCID} = 1$ (OCC = 4) |
| 6 | 1 layer, antenna port 13, $n_{SCID} = 0$ (OCC = 4) | 6 | 1 layer, antenna port 13, $n_{SCID} = 0$ (OCC = 4) |
| 7 | 1 layer, antenna port 13, $n_{SCID} = 1$ (OCC = 4) | 7 | 1 layer, antenna port 13, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) |
| 9 | 1 layer, antenna port 9, $n_{SCID} = 1$ (OCC = 4) | 9 | 2 layers, antenna ports 9 and 10, $n_{SCID} = 1$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) |
| 11 | 1 layer, antenna port 10, $n_{SCID} = 1$ (OCC = 4) | 11 | 2 layers, antenna ports 12 and 14, $n_{SCID} = 1$ (OCC = 4) |
| 12 | 1 layer, antenna port 12, $n_{SCID} = 0$ (OCC = 4) | 12 | 3 layers, antenna ports 7 to 9, $n_{SCID} = 0$ (OCC = 4) |
| 13 | 1 layer, antenna port 12, $n_{SCID} = 1$ (OCC = 4) | 13 | 3 layers, antenna ports 12 to 14, $n_{SCID} = 1$ (OCC = 4) |
| 14 | 1 layer, antenna port 14, $n_{SCID} = 0$ (OCC = 4) | 14 | 4 layers, antenna ports 7 to 10, $n_{SCID} = 0$ (OCC = 4) |
| 15 | 1 layer, antenna port 14, $n_{SCID} = 1$ (OCC = 4) | 15 | 4 layers, antenna ports 11 to 14, $n_{SCID} = 1$ (OCC = 4) |

Table 3 is the first type of DMRS configuration table for single-codeword transmission. In Table 3:

Single-codeword transmission mode for new-data transmission: state values 0 to 15 of the DMRS configuration indicate that spatial multiplexing can be configured for a maximum of 16 single-stream users in a system, and 1-layer transmission is supported for each user. Eight antenna ports are made orthogonal to each other by using a 4-bit OCC and frequency division multiplexing, and one antenna port uses different pseudorandom sequences ($n_{SCID}=0$ and $n_{SCID}=1$) to randomize interference between different layers.

Single-codeword transmission for retransmission: state values 0 to 7 of the DMRS configuration indicate that spatial multiplexing can be configured for a maximum of eight single-stream retransmission users in the system; state values 8 to 11 of the DMRS configuration indicate that spatial multiplexing can be configured for four single-codeword dual-stream retransmission users in the system, that is, dual-stream retransmission for MU-MIMO; a state value 12 or 13 of the DMRS configuration indicates that spatial multiplexing can be configured for two single-codeword three-stream retransmission users in the system, that is, three-stream retransmission for MU-MIMO; and a state value 14 or 15 of the DMRS configuration indicates that spatial multiplexing can be configured for two single-codeword four-stream retransmission users in the system, that is, four-stream retransmission for MU-MIMO. It should be noted that all or some of the 16 state values used for the single-codeword transmission for retransmission can be reserved according to an actual requirement.

With the NDI-based DMRS configuration, the system can support multi-stream retransmission for MU-MIMO, and can also flexibly support spatial multiplexing between users supporting different quantities of layers.

Further, based on Table 3, dual-codeword transmission may have the following two configuration manners.

TABLE 4

First type of DMRS configuration table for dual-codeword transmission
Dual-codeword transmission

| State value | Meaning |
| --- | --- |
| 0 | 2 layers, antenna ports 7 and 8, $n_{SCID} = 0$ (OCC = 4) |
| 1 | 2 layers, antenna ports 7 and 8, $n_{SCID} = 1$ (OCC = 4) |
| 2 | 2 layers, antenna ports 11 and 13, $n_{SCID} = 0$ (OCC = 4) |

TABLE 4-continued

First type of DMRS configuration table for dual-codeword transmission
Dual-codeword transmission

| State value | Meaning |
|---|---|
| 3 | 2 layers, antenna ports 11 and 13, $n_{SCID}$ = 1 (OCC = 4) |
| 4 | 2 layers, antenna ports 9 and 10, $n_{SCID}$ = 0 (OCC = 4) |
| 5 | 2 layers, antenna ports 9 and 10, $n_{SCID}$ = 1 (OCC = 4) |
| 6 | 2 layers, antenna ports 12 and 14, $n_{SCID}$ = 0 (OCC = 4) |
| 7 | 2 layers, antenna ports 12 and 14, $n_{SCID}$ = 1 (OCC = 4) |
| 8 | 3 layers, antenna ports 7 to 9, $n_{SCID}$ = 0 (OCC = 4) |
| 9 | 3 layers, antenna ports 7 to 9, $n_{SCID}$ = 1 (OCC = 4) |
| 10 | 4 layers, antenna ports 7 to 10, $n_{SCID}$ = 0 (OCC = 4) |
| 11 | 4 layers, antenna ports 7 to 10, $n_{SCID}$ = 1 (OCC = 4) |
| 12 | 5 layers, antenna ports 7 to 11 |
| 13 | 6 layers, antenna ports 7 to 12 |
| 14 | 7 layers, antenna ports 7 to 13 |
| 15 | 8 layers, antenna ports 7 to 14 |

Table 4 is the first type of DMRS configuration table for dual-codeword transmission. As listed in Table 4, for dual-codeword transmission, state values 0 to 7 of the DMRS configuration may indicate that spatial multiplexing can be configured for a maximum of eight dual-stream users in the system, and 2-layer transmission is supported for each user. In this case, a system can support a maximum of 16 layers of MU-MIMO transmission. State values 8 and 9 corresponding to the DMRS configuration may indicate that spatial multiplexing can be configured for two dual-codeword three-stream users in the system, and 3-layer transmission is supported for each user. In this case, the system can support a maximum of six layers of MU-MIMO transmission. State values 10 and 11 of the DMRS configuration may indicate that spatial multiplexing can be configured for two dual-codeword four-stream users in the system, and 4-layer transmission is supported for each user. In this case, the system can support a maximum of eight layers of MU-MIMO transmission. State values 12 to 15 of the DMRS configuration may indicate SU-MIMO transmission. For example, the state value 15 may indicate transmission of up to eight layers, and antenna ports 7 to 14 are configured to ensure orthogonality between DMRSs of the eight layers.

TABLE 5

Second type of DMRS configuration table for dual-codeword transmission
Dual-codeword transmission

| State value | Meaning |
|---|---|
| 0 | 2 layers, antenna ports 7 and 8, $n_{SCID}$ = 0 (OCC = 4) |
| 1 | 2 layers, antenna ports 7 and 8, $n_{SCID}$ = 1 (OCC = 4) |
| 2 | 2 layers, antenna ports 11 and 13, $n_{SCID}$ = 0 (OCC = 4) |
| 3 | 2 layers, antenna ports 11 and 13, $n_{SCID}$ = 1 (OCC = 4) |
| 4 | 2 layers, antenna ports 9 and 10, $n_{SCID}$ = 0 (OCC = 4) |
| 5 | 2 layers, antenna ports 9 and 10, $n_{SCID}$ = 1 (OCC = 4) |
| 6 | 2 layers, antenna ports 12 and 14, $n_{SCID}$ = 0 (OCC = 4) |

TABLE 5-continued

Second type of DMRS configuration table for dual-codeword transmission
Dual-codeword transmission

| State value | Meaning |
|---|---|
| 7 | 2 layers, antenna ports 12 and 14, $n_{SCID}$ = 1 (OCC = 4) |
| 8 | 3 layers, antenna ports 7 to 9, $n_{SCID}$ = 0 (OCC = 4) |
| 9 | 3 layers, antenna ports 7 to 9, $n_{SCID}$ = 1 (OCC = 4) |
| 10 | 3 layers, antenna ports 12 to 14, $n_{SCID}$ = 0 (OCC = 4) |
| 11 | 3 layers, antenna ports 12 to 14, $n_{SCID}$ = 1 (OCC = 4) |
| 12 | 4 layers, antenna ports 7 to 10, $n_{SCID}$ = 0 (OCC = 4) |
| 13 | 4 layers, antenna ports 7 to 10, $n_{SCID}$ = 1 (OCC = 4) |
| 14 | 4 layers, antenna ports 11 to 14, $n_{SCID}$ = 0 (OCC = 4) |
| 15 | 4 layers, antenna ports 11 to 14, $n_{SCID}$ = 1 (OCC = 4) |

Table 5 is the second type of DMRS configuration table for dual-codeword transmission. As listed in FIG. 5, for dual-codeword transmission, system configurations that can be indicated by state values 0 to 7 of the DMRS configuration are consistent with the system configurations in Table 4. State values 8 to 11 of the DMRS configuration may indicate that spatial multiplexing can be configured for four dual-codeword three-stream transmission users in the system, and 3-layer transmission is supported for each user. In this case, the system can support a maximum of 12 layers of MU-MIMO transmission. Compared with Table 4, two more dual-codeword three-stream transmission users can be configured, and a maximum quantity of supported MU-MIMO transmission layers is doubled. State values 12 to 15 of the DMRS configuration may indicate that spatial multiplexing can be configured for four dual-codeword four-stream transmission users in the system, and 4-layer transmission is supported for each user. In this case, the system can support a maximum of 16 layers of MU-MIMO transmission. Compared with Table 4, two more dual-codeword four-stream transmission users can be configured, and the maximum quantity of supported MU-MIMO transmission layers is doubled.

It should be noted that a maximum of only four layers of SU-MIMO transmission can be supported in a scenario of dual-codeword transmission in Table 5 (as listed in Table 5, a maximum quantity of transmission layers corresponding to each state value in the scenario of dual-codeword transmission is 4). When relatively few antennas are configured for user equipment or there is no rich scattering in an environment around a user (for example, a quantity of antennas of the user equipment does not meet a requirement of 8-layer transmission, or a channel condition (or channel degree of freedom) does not meet a requirement of 8-layer transmission), it may be impossible or unnecessary to configure MIMO transmission of up to 8 layers for SU-MIMO. Correspondingly, more users and layers are required to be supported for MU-MIMO transmission. According to the DMRS configuration in Table 5, as many users and transmission layers that can be configured for MU-MIMO as possible are utilized, and a system capacity can be further improved.

TABLE 6

Another type of DMRS configuration table provided in an embodiment of the present invention

| Single-codeword transmission 1 MCS2 = 0, RV2 = 1, NDI2 = 1 | | Single-codeword transmission 2 MCS2 = 0, RV2 = 1, NDI2 = 0 | | Dual-codeword transmission | |
|---|---|---|---|---|---|
| State value | Meaning | State value | Meaning | State value | Meaning |
| 0 | 1 layer, antenna port 7, $n_{SCID}$ = 0 (OCC = 4) | 0 | 1 layer, antenna port 7, $n_{SCID}$ = x (OCC = 4) | 0 | 2 layers, antenna ports 7 and 8, $n_{SCID}$ = 0 (OCC = 4) |

TABLE 6-continued

Another type of DMRS configuration table provided in an embodiment of the present invention

| Single-codeword transmission 1 MCS2 = 0, RV2 = 1, NDI2 = 1 | | Single-codeword transmission 2 MCS2 = 0, RV2 = 1, NDI2 = 0 | | Dual-codeword transmission | |
|---|---|---|---|---|---|
| State value | Meaning | State value | Meaning | State value | Meaning |
| 1 | 1 layer, antenna port 7, $n_{SCID}$ = 1 (OCC = 4) | 1 | 1 layer, antenna port 8, $n_{SCID}$ = x (OCC = 4) | 1 | 2 layers, antenna ports 7 and 8, $n_{SCID}$ = 1 (OCC = 4) |
| 2 | 1 layer, antenna port 8, $n_{SCID}$ = 0 (OCC = 4) | 2 | 1 layer, antenna port 11, $n_{SCID}$ = x (OCC = 4) | 2 | 2 layers, antenna ports 7 and 8, $n_{SCID}$ = x (OCC = 4) |
| 3 | 1 layer, antenna port 8, $n_{SCID}$ = 1 (OCC = 4) | 3 | 1 layer, antenna port 13, $n_{SCID}$ = x (OCC = 4) | 3 | 2 layers, antenna ports 11 and 13, $n_{SCID}$ = 0 (OCC = 4) |
| 4 | 1 layer, antenna port 11, $n_{SCID}$ = 0 (OCC = 4) | 4 | 1 layer, antenna port 9, $n_{SCID}$ = x (OCC = 4) | 4 | 2 layers, antenna ports 11 and 13, $n_{SCID}$ = 1 (OCC = 4) |
| 5 | 1 layer, antenna port 11, $n_{SCID}$ = 1 (OCC = 4) | 5 | 1 layer, antenna port 10, $n_{SCID}$ = x (OCC = 4) | 5 | 2 layers, antenna ports 11 and 13, $n_{SCID}$ = x (OCC = 4) |
| 6 | 1 layer, antenna port 13, $n_{SCID}$ = 0 (OCC = 4) | 6 | 1 layer, antenna port 12, $n_{SCID}$ = x (OCC = 4) | 6 | 2 layers, antenna ports 9 and 10, $n_{SCID}$ = 0 (OCC = 4) |
| 7 | 1 layer, antenna port 13, $n_{SCID}$ = 1 (OCC = 4) | 7 | 1 layer, antenna port 14, $n_{SCID}$ = x (OCC = 4) | 7 | 2 layers, antenna ports 9 and 10, $n_{SCID}$ = 1 (OCC = 4) |
| 8 | 1 layer, antenna port 9, $n_{SCID}$ = 0 (OCC = 4) | 8 | 2 layers, antenna ports 7 and 8, $n_{SCID}$ = 0 (OCC = 4) | 8 | 2 layers, antenna ports 9 and 10, $n_{SCID}$ = x (OCC = 4) |
| 9 | 1 layer, antenna port 9, $n_{SCID}$ = 1 (OCC = 4) | 9 | 2 layers, antenna ports 7 and 8, $n_{SCID}$ = 1 (OCC = 4) | 9 | 2 layers, antenna ports 12 and 14, $n_{SCID}$ = 0 (OCC = 4) |
| 10 | 1 layer, antenna port 10, $n_{SCID}$ = 0 (OCC = 4) | 10 | 2 layers, antenna ports 11 and 13, $n_{SCID}$ = 0 (OCC = 4) | 10 | 2 layers, antenna ports 12 and 14, $n_{SCID}$ = 1 (OCC = 4) |
| 11 | 1 layer, antenna port 10, $n_{SCID}$ = 1 (OCC = 4) | 11 | 2 layers, antenna ports 11 and 13, $n_{SCID}$ = 1 (OCC = 4) | 11 | 2 layers, antenna ports 12 and 14, $n_{SCID}$ = x (OCC = 4) |
| 12 | 1 layer, antenna port 12, $n_{SCID}$ = 0 (OCC = 4) | 12 | 3 layers, antenna ports 7 to 9, $n_{SCID}$ = 0 (OCC = 4) | 12 | 3 layers, antenna ports 7 to 9 |
| 13 | 1 layer, antenna port 12, $n_{SCID}$ = 1 (OCC = 4) | 13 | 3 layers, antenna ports 7 to 9, $n_{SCID}$ = 1 (OCC = 4) | 13 | 4 layers, antenna ports 7 to 10 |
| 14 | 1 layer, antenna port 14, $n_{SCID}$ = 0 (OCC = 4) | 14 | 3 layers, antenna ports 12 to 14, $n_{SCID}$ = 0 (OCC = 4) | 14 | 5 layers, antenna ports 7 to 11 |
| 15 | 1 layer, antenna port 14, $n_{SCID}$ = 1 (OCC = 4) | 15 | 3 layers, antenna ports 12 to 14, $n_{SCID}$ = 1 (OCC = 4) | 15 | 6 layers, antenna ports 7 to 12 |

Table 6 is another type of DMRS configuration table provided in this embodiment of the present invention. As listed in Table 6, single-codeword transmission includes two transmission modes: single-codeword transmission 1 and single-codeword transmission 2. MCS2=0, RV2=1, and NDI2=1 indicate the single-codeword transmission 1; and MCS2=0, RV2=1, and NDI2=0 indicate the single-codeword transmission 2. That is, a quantity of state values for single-codeword transmission is increased by using an NDI (that is, NDI2) corresponding to the codeword 1 (that is, the codeword in the disable state). Other values may be used to indicate dual-codeword transmission.

Further, because the NDI2 is originally not used for single-codeword transmission, it is unnecessary to use the NDI2 to indicate a single codeword for new-data transmission or a single codeword for retransmission. Therefore, in practical application, the single-codeword transmission 1 and the single-codeword transmission 2 may be used together to implement spatial multiplexing of 24 single-stream users, and 1-layer transmission is supported for each user. Specifically, state values 0 to 15 of the DMRS configuration for the single-codeword transmission 1 and state values 0 to 7 of the DMRS configuration for the single-codeword transmission 2 indicate that spatial multiplexing can be configured for a maximum of 16 single-stream users in the system, and 1-layer transmission is supported for each user. Eight antenna ports are made orthogonal to each other by using a 4-bit OCC and frequency division multiplexing, and one antenna port uses different pseudorandom sequences ($n_{SCID}$=0, $n_{SCID}$=1, and $n_{SCID}$=x) to randomize interference between different layers.

State values 8 to 11 of the DMRS configuration for the single-codeword transmission 2 indicate that spatial multiplexing can be configured for four single-codeword dual-stream retransmission users in the system, that is, dual-stream retransmission for MU-MIMO. State values 12 to 15 of the DMRS configuration for the single-codeword transmission 2 indicate that spatial multiplexing can be configured for four single-codeword three-stream retransmission users in the system, that is, three-stream retransmission for MU-MIMO. It should be noted that all or some of the eight state values (that is, the state values 8 to 15) for the single-codeword transmission 2 may be reserved according to an actual requirement.

State values 0 to 11 of the DMRS configuration for the dual-codeword transmission may indicate that spatial multiplexing can be configured for a maximum of 12 dual-stream users in the system, and 2-layer transmission is supported for each user. In this case, the system can support a maximum of 24 layers of MU-MIMO transmission. State values 12 to 15 of the DMRS configuration for the dual-codeword transmission may indicate SU-MIMO transmission. For example, the state value 15 may indicate transmission of up to six layers, and antenna ports 7 to 12 are configured to ensure orthogonality between DMRSs of the six layers.

In this embodiment of the present invention, an existing new data indicator in existing signaling is used to increase a quantity of state values of a reference signal configuration, so that a quantity of spatial multiplexing data streams can be increased, and higher-rank MU-MIMO and multi-layer retransmission for MU-MIMO can be supported.

In conclusion, the reference signal configuration method provided in this embodiment of the present invention can increase a quantity of available configuration state values of a reference signal (such as a DMRS) without increasing signaling overheads, so that a reference signal configuration of more layers (such as 16 layers or 24 layers) and the multi-layer retransmission for MU-MIMO can be supported.

Specifically, the reference signal configuration method provided in this embodiment of the present invention includes:

generating control signaling carrying configuration information of a reference signal; and sending the control signaling.

The configuration information of the reference signal includes a configuration mode field and a configuration parameter field.

The configuration mode field is used to indicate a reference signal configuration mode, and optional reference signal configuration modes include two single-codeword transmission modes and a dual-codeword transmission mode. Specifically, the configuration mode field includes a modulation and coding scheme, a redundancy version, and a transmission status indication. The transmission status indication is used to distinguish between the two single-codeword transmission modes. Specifically, the transmission status indication may be a new data indicator NDI, the configuration mode field includes a first NDI and a second NDI, and both of the NDIs can be used to distinguish between two types of single-codeword transmission. The first NDI may be used to distinguish between single-codeword transmission for new-data transmission and single-codeword transmission for retransmission. The second NDI may be used to distinguish between single-codeword transmission 1 and single-codeword transmission 2. State values of the two types of single-codeword transmission can be jointly used to implement spatial multiplexing for more single-stream users.

The configuration parameter field is used to indicate a reference signal configuration parameter. Specifically, the reference signal configuration parameter includes one or more of a data transmission layer quantity, an antenna port number, or a scrambling identity. For example, the configuration parameter field is used to indicate a state value of a reference signal (for example, for the state values 0 to 15 in Table 6, a total of four bits are required; or when a quantity of state values is not greater than 8, only three bits are required). The state value of the reference signal is corresponding to at least one of the data transmission layer quantity, the antenna port, or the scrambling identity of the reference signal (for example, the state value 0 of the state values in a first column of Table 6 is corresponding to one layer of data transmission, an antenna port number 7, and an initial value 1 of the scrambling identity).

Specifically, in different configuration modes, the configuration parameter field indicates different reference signal configuration parameters. Specifically, in this embodiment of the present invention, the configuration modes of the DMRS configuration are classified into three types (two single-codeword transmission modes and one dual-codeword transmission mode) by using the transmission status indication (the NDI1 and the NDI2). In each configuration mode, 16 state values may be set, and configuration parameters corresponding to every 16 state values match the configuration mode. For example, for the single-codeword transmission mode for new-data transmission, MU-MIMO transmission of more layers needs to be provided, and therefore, a configuration parameter corresponding to the 16 state values can be set appropriately, so as to 16-layer MU-MIMO transmission.

Therefore, there may be three groups of configuration results that are indicated by the configuration mode field and the configuration parameter field provided in the present invention (that is, the state values in the three configuration modes indicate a group of configuration results, and there are three groups of such configuration results). MCS represents a modulation and coding scheme, RV represents a redundancy version, NDI represents a new data indicator, port represents an antenna port, $n_{SCID}$ represents an initial value code of a scrambling identity, and OCC represents an orthogonal cover code.

The following table lists a first group of configuration results.

| Single-codeword transmission for new-data transmission (MCS2 = 0, RV2 = 1, NDI1 = 1) | | Single-codeword transmission for retransmission (MCS2 = 0, RV2 = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID}$ = 0 (OCC = 4) | 0 | 1 layer, antenna port 7, $n_{SCID}$ = 0 (OCC = 4) | 0 | 2 layers, antenna ports 7 and 8, $n_{SCID}$ = 0 (OCC = 4) |
| 1 | 1 layer, antenna port 7, $n_{SCID}$ = 1 (OCC = 4) | 1 | 1 layer, antenna port 7, $n_{SCID}$ = 1 (OCC = 4) | 1 | 2 layers, antenna ports 7 and 8, $n_{SCID}$ = 1 (OCC = 4) |

| Single-codeword transmission for new-data transmission (MCS2 = 0, RV2 = 1, NDI1 = 1) | | Single-codeword transmission for retransmission (MCS2 = 0, RV2 = 1, NDI1 = 0) | | Dual-codeword transmission | |
|---|---|---|---|---|---|
| State value | Meaning | State value | Meaning | State value | Meaning |
| 2 | 1 layer, antenna port 8, $n_{SCID}$ = 0 (OCC = 4) | 2 | 1 layer, antenna port 8, $n_{SCID}$ = 0 (OCC = 4) | 2 | 2 layers, antenna ports 11 and 13, $n_{SCID}$ = 0 (OCC = 4) |
| 3 | 1 layer, antenna port 8, $n_{SCID}$ = 1 (OCC = 4) | 3 | 1 layer, antenna port 8, $n_{SCID}$ = 1 (OCC = 4) | 3 | 2 layers, antenna ports 11 and 13, $n_{SCID}$ = 1 (OCC = 4) |
| 4 | 1 layer, antenna port 11, $n_{SCID}$ = 0 (OCC = 4) | 4 | 1 layer, antenna port 11, $n_{SCID}$ = 0 (OCC = 4) | 4 | 2 layers, antenna ports 9 and 10, $n_{SCID}$ = 0 (OCC = 4) |
| 5 | 1 layer, antenna port 11, $n_{SCID}$ = 1 (OCC = 4) | 5 | 1 layer, antenna port 11, $n_{SCID}$ = 1 (OCC = 4) | 5 | 2 layers, antenna ports 9 and 10, $n_{SCID}$ = 1 (OCC = 4) |
| 6 | 1 layer, antenna port 13, $n_{SCID}$ = 0 (OCC = 4) | 6 | 1 layer, antenna port 13, $n_{SCID}$ = 0 (OCC = 4) | 6 | 2 layers, antenna ports 12 and 14, $n_{SCID}$ = 0 (OCC = 4) |
| 7 | 1 layer, antenna port 13, $n_{SCID}$ = 1 (OCC = 4) | 7 | 1 layer, antenna port 13, $n_{SCID}$ = 1 (OCC = 4) | 7 | 2 layers, antenna ports 12 and 14, $n_{SCID}$ = 1 (OCC = 4) |
| 8 | 1 layer, antenna port 9, $n_{SCID}$ = 0 (OCC = 4) | 8 | 2 layers, antenna ports 7 and 8, $n_{SCID}$ = 0 (OCC = 4) | 8 | 3 layers, antenna ports 7 to 9, $n_{SCID}$ = 0 (OCC = 4) |
| 9 | 1 layer, antenna port 9, $n_{SCID}$ = 1 (OCC = 4) | 9 | 2 layers, antenna ports 9 and 10, $n_{SCID}$ = 0 (OCC = 4) | 9 | 3 layers, antenna ports 7 to 9, $n_{SCID}$ = 1 (OCC = 4) |
| 10 | 1 layer, antenna port 10, $n_{SCID}$ = 0 (OCC = 4) | 10 | 2 layers, antenna ports 11 and 13, $n_{SCID}$ = 0 (OCC = 4) | 10 | 4 layers, antenna ports 7 to 10, $n_{SCID}$ = 0 (OCC = 4) |
| 11 | 1 layer, antenna port 10, $n_{SCID}$ = 1 (OCC = 4) | 11 | 2 layers, antenna ports 12 and 14, $n_{SCID}$ = 0 (OCC = 4) | 11 | 4 layers, antenna ports 7 to 10, $n_{SCID}$ = 1 (OCC = 4) |
| 12 | 1 layer, antenna port 12, $n_{SCID}$ = 0 (OCC = 4) | 12 | 3 layers, antenna ports 7 to 9, $n_{SCID}$ = 0 (OCC = 4) | 12 | 5 layers, antenna ports 7 to 11 |
| 13 | 1 layer, antenna port 12, $n_{SCID}$ = 1 (OCC = 4) | 13 | 3 layers, antenna ports 12 to 14, $n_{SCID}$ = 0 (OCC = 4) | 13 | 6 layers, antenna ports 7 to 12 |
| 14 | 1 layer, antenna port 14, $n_{SCID}$ = 0 (OCC = 4) | 14 | 4 layers, antenna ports 7 to 10, $n_{SCID}$ = 0 (OCC = 4) | 14 | 7 layers, antenna ports 7 to 13 |
| 15 | 1 layer, antenna port 14, $n_{SCID}$ = 1 (OCC = 4) | 15 | 4 layers, antenna ports 11 to 14, $n_{SCID}$ = 0 (OCC = 4) | 15 | 8 layers, antenna ports 7 to 14 |

Specifically, the first group of configuration results may: 1. support SU-MIMO configuration of up to eight layers; 2. support MU-MIMO configuration of up to 16 layers; and 3. support MU-MIMO configuration for single-codeword multi-layer retransmission.

The following table lists a second group of configuration results.

| Single-codeword transmission for new-data transmission (MCS2 = 0, RV2 = 1, NDI1 = 1) | | Single-codeword transmission for retransmission (MCS2 = 0, RV2 = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID}$ = 0 (OCC = 4) | 0 | 1 layer, antenna port 7, $n_{SCID}$ = 0 (OCC = 4) | 0 | 2 layers, antenna ports 7 and 8, $n_{SCID}$ = 0 (OCC = 4) |
| 1 | 1 layer, antenna port 7, $n_{SCID}$ = 1 (OCC = 4) | 1 | 1 layer, antenna port 7, $n_{SCID}$ = 1 (OCC = 4) | 1 | 2 layers, antenna ports 7 and 8, $n_{SCID}$ = 1 (OCC = 4) |
| 2 | 1 layer, antenna port 8, $n_{SCID}$ = 0 (OCC = 4) | 2 | 1 layer, antenna port 8, $n_{SCID}$ = 0 (OCC = 4) | 2 | 2 layers, antenna ports 11 and 13, $n_{SCID}$ = 0 (OCC = 4) |
| 3 | 1 layer, antenna port 8, $n_{SCID}$ = 1 (OCC = 4) | 3 | 1 layer, antenna port 8, $n_{SCID}$ = 1 (OCC = 4) | 3 | 2 layers, antenna ports 11 and 13, $n_{SCID}$ = 1 (OCC = 4) |
| 4 | 1 layer, antenna port 11, $n_{SCID}$ = 0 (OCC = 4) | 4 | 1 layer, antenna port 11, $n_{SCID}$ = 0 (OCC = 4) | 4 | 2 layers, antenna ports 9 and 10, $n_{SCID}$ = 0 (OCC = 4) |
| 5 | 1 layer, antenna port 11, $n_{SCID}$ = 1 (OCC = 4) | 5 | 1 layer, antenna port 11, $n_{SCID}$ = 1 (OCC = 4) | 5 | 2 layers, antenna ports 9 and 10, $n_{SCID}$ = 1 (OCC = 4) |
| 6 | 1 layer, antenna port 13, $n_{SCID}$ = 0 (OCC = 4) | 6 | 1 layer, antenna port 13, $n_{SCID}$ = 0 (OCC = 4) | 6 | 2 layers, antenna ports 12 and 14, $n_{SCID}$ = 0 (OCC = 4) |

| Single-codeword transmission for new-data transmission (MCS2 = 0, RV2 = 1, NDI1 = 1) | | Single-codeword transmission for retransmission (MCS2 = 0, RV2 = 1, NDI1 = 0) | | Dual-codeword transmission | |
|---|---|---|---|---|---|
| State value | Meaning | State value | Meaning | State value | Meaning |
| 7 | 1 layer, antenna port 13, $n_{SCID}$ = 1 (OCC = 4) | 7 | 1 layer, antenna port 13, $n_{SCID}$ = 1 (OCC = 4) | 7 | 2 layers, antenna ports 12 and 14, $n_{SCID}$ = 1 (OCC = 4) |
| 8 | 1 layer, antenna port 9, $n_{SCID}$ = 0 (OCC = 4) | 8 | 2 layers, antenna ports 7 and 8, $n_{SCID}$ = 0 (OCC = 4) | 8 | 3 layers, antenna ports 7 to 9, $n_{SCID}$ = 0 (OCC = 4) |
| 9 | 1 layer, antenna port 9, $n_{SCID}$ = 1 (OCC = 4) | 9 | 2 layers, antenna ports 9 and 10, $n_{SCID}$ = 0 (OCC = 4) | 9 | 3 layers, antenna ports 7 to 9, $n_{SCID}$ = 1 (OCC = 4) |
| 10 | 1 layer, antenna port 10, $n_{SCID}$ = 0 (OCC = 4) | 10 | 2 layers, antenna ports 11 and 13, $n_{SCID}$ = 0 (OCC = 4) | 10 | 3 layers, antenna ports 12 to 14, $n_{SCID}$ = 0 (OCC = 4) |
| 11 | 1 layer, antenna port 10, $n_{SCID}$ = 1 (OCC = 4) | 11 | 2 layers, antenna ports 12 and 14, $n_{SCID}$ = 0 (OCC = 4) | 11 | 3 layers, antenna ports 12 to 14, $n_{SCID}$ = 1 (OCC = 4) |
| 12 | 1 layer, antenna port 12, $n_{SCID}$ = 0 (OCC = 4) | 12 | 3 layers, antenna ports 7 to 9, $n_{SCID}$ = 0 (OCC = 4) | 12 | 4 layers, antenna ports 7 to 10, $n_{SCID}$ = 0 (OCC = 4) |
| 13 | 1 layer, antenna port 12, $n_{SCID}$ = 1 (OCC = 4) | 13 | 3 layers, antenna ports 12 to 14, $n_{SCID}$ = 0 (OCC = 4) | 13 | 4 layers, antenna ports 7 to 10, $n_{SCID}$ = 1 (OCC = 4) |
| 14 | 1 layer, antenna port 14, $n_{SCID}$ = 0 (OCC = 4) | 14 | 4 layers, antenna ports 7 to 10, $n_{SCID}$ = 0 (OCC = 4) | 14 | 4 layers, antenna ports 11 to 14, $n_{SCID}$ = 0 (OCC = 4) |
| 15 | 1 layer, antenna port 14, $n_{SCID}$ = 1 (OCC = 4) | 15 | 4 layers, antenna ports 11 to 14, $n_{SCID}$ = 0 (OCC = 4) | 15 | 4 layers, antenna ports 11 to 14, $n_{SCID}$ = 1 (OCC = 4) |

Specifically, the second group of configuration results may: 1. support SU-MIMO configuration of up to four layers; 2. support MU-MIMO configuration of up to 16 layers; 3. support MU-MIMO configuration for single-codeword multi-layer retransmission; and 4. support high-rank (two or more layers) MU-MIMO configuration of up to four users.

The following table lists a third group of configuration results.

| Single-codeword transmission 1 MCS2 = 0, RV2 = 1, NDI2 = 1 | | Single-codeword transmission 2 MCS2 = 0, RV2 = 1, NDI2 = 0 | | Dual-codeword transmission | |
|---|---|---|---|---|---|
| State value | Meaning | State value | Meaning | State value | Meaning |
| 0 | 1 layer, antenna port 7, $n_{SCID}$ = 0 (OCC = 4) | 0 | 1 layer, antenna port 7, $n_{SCID}$ = x (OCC = 4) | 0 | 2 layers, antenna ports 7 and 8, $n_{SCID}$ = 0 (OCC = 4) |
| 1 | 1 layer, antenna port 7, $n_{SCID}$ = 1 (OCC = 4) | 1 | 1 layer, antenna port 8, $n_{SCID}$ = x (OCC = 4) | 1 | 2 layers, antenna ports 7 and 8, $n_{SCID}$ = 1 (OCC = 4) |
| 2 | 1 layer, antenna port 8, $n_{SCID}$ = 0 (OCC = 4) | 2 | 1 layer, antenna port 11, $n_{SCID}$ = x (OCC = 4) | 2 | 2 layers, antenna ports 7 and 8, $n_{SCID}$ = x (OCC = 4) |
| 3 | 1 layer, antenna port 8, $n_{SCID}$ = 1 (OCC = 4) | 3 | 1 layer, antenna port 13, $n_{SCID}$ = x (OCC = 4) | 3 | 2 layers, antenna ports 11 and 13, $n_{SCID}$ = 0 (OCC = 4) |
| 4 | 1 layer, antenna port 11, $n_{SCID}$ = 0 (OCC = 4) | 4 | 1 layer, antenna port 9, $n_{SCID}$ = x (OCC = 4) | 4 | 2 layers, antenna ports 11 and 13, $n_{SCID}$ = 1 (OCC = 4) |
| 5 | 1 layer, antenna port 11, $n_{SCID}$ = 1 (OCC = 4) | 5 | 1 layer, antenna port 10, $n_{SCID}$ = x (OCC = 4) | 5 | 2 layers, antenna ports 11 and 13, $n_{SCID}$ = x (OCC = 4) |
| 6 | 1 layer, antenna port 13, $n_{SCID}$ = 0 (OCC = 4) | 6 | 1 layer, antenna port 12, $n_{SCID}$ = x (OCC = 4) | 6 | 2 layers, antenna ports 9 and 10, $n_{SCID}$ = 0 (OCC = 4) |
| 7 | 1 layer, antenna port 13, $n_{SCID}$ = 1 (OCC = 4) | 7 | 1 layer, antenna port 14, $n_{SCID}$ = x (OCC = 4) | 7 | 2 layers, antenna ports 9 and 10, $n_{SCID}$ = 1 (OCC = 4) |
| 8 | 1 layer, antenna port 9, $n_{SCID}$ = 0 (OCC = 4) | 8 | 2 layers, antenna ports 7 and 8, $n_{SCID}$ = 0 (OCC = 4) | 8 | 2 layers, antenna ports 9 and 10, $n_{SCID}$ = x (OCC = 4) |
| 9 | 1 layer, antenna port 9, $n_{SCID}$ = 1 (OCC = 4) | 9 | 2 layers, antenna ports 7 and 8, $n_{SCID}$ = 1 (OCC = 4) | 9 | 2 layers, antenna ports 12 and 14, $n_{SCID}$ = 0 (OCC = 4) |

-continued

| | Single-codeword transmission 1 MCS2 = 0, RV2 = 1, NDI2 = 1 | | Single-codeword transmission 2 MCS2 = 0, RV2 = 1, NDI2 = 0 | | Dual-codeword transmission |
|---|---|---|---|---|---|
| State value | Meaning | State value | Meaning | State value | Meaning |
| 10 | 1 layer, antenna port 10, $n_{SCID}$ = 0 (OCC = 4) | 10 | 2 layers, antenna ports 11 and 13, $n_{SCID}$ = 0 (OCC = 4) | 10 | 2 layers, antenna ports 12 and 14, $n_{SCID}$ = 1 (OCC = 4) |
| 11 | 1 layer, antenna port 10, $n_{SCID}$ = 1 (OCC = 4) | 11 | 2 layers, antenna ports 11 and 13, $n_{SCID}$ = 1 (OCC = 4) | 11 | 2 layers, antenna ports 12 and 14, $n_{SCID}$ = x (OCC = 4) |
| 12 | 1 layer, antenna port 12, $n_{SCID}$ = 0 (OCC = 4) | 12 | 3 layers, antenna ports 7 to 9, $n_{SCID}$ = 0 (OCC = 4) | 12 | 3 layers, antenna ports 7 to 9 |
| 13 | 1 layer, antenna port 12, $n_{SCID}$ = 1 (OCC = 4) | 13 | 3 layers, antenna ports 7 to 9, $n_{SCID}$ = 1 (OCC = 4) | 13 | 4 layers, antenna ports 7 to 10 |
| 14 | 1 layer, antenna port 14, $n_{SCID}$ = 0 (OCC = 4) | 14 | 3 layers, antenna ports 12 to 14, $n_{SCID}$ = 0 (OCC = 4) | 14 | 5 layers, antenna ports 7 to 11 |
| 15 | 1 layer, antenna port 14, $n_{SCID}$ = 1 (OCC = 4) | 15 | 3 layers, antenna ports 12 to 14, $n_{SCID}$ = 1 (OCC = 4) | 15 | 6 layers, antenna ports 7 to 12 |

Specifically, the third group of configuration results may: 1. support SU-MIMO configuration of up to eight layers; 2. support MU-MIMO configuration of up to 24 layers; and 3. support MU-MIMO configuration for single-codeword multi-layer retransmission.

Further, switching between the foregoing three groups of configuration results may be performed by using high-layer signaling (such as radio resource control (RRC) signaling). When there is a need to switch between the configuration results needs to be performed, RRC signaling may be sent to user equipment. The RRC signaling instructs the user equipment to switch a configuration. A scenario in which the DMRS configuration needs to be switched may be determined according to different user antenna quantities, a channel condition, or the like. High-rank (for example, 8-layer) SU-MIMO and multi-layer MU-MIMO of more users can be flexibly used for the switching, so as to implement desired data transmission and increase a system throughput.

It should be noted that, in the configuration results provided in this embodiment of the present invention, a specific meaning of each state value can be flexibly adjusted. For example, according to an actual requirement, the configuration result may be set to an MU-MIMO configuration supporting 18 (or any value between 16 and 24) layers. Specifically, the meanings of the state values in each configuration mode may be flexibly set, provided that streams configured based on the meanings of the state values are orthogonal or interference-randomized. It should be further noted that some or all of specific state values for the single-codeword transmission (such as all the state values for the single-codeword transmission for retransmission, the state values 8 to 15 for the single-codeword transmission 1, or all the state values for the dual-codeword transmission) may be reserved according to an actual requirement.

In this embodiment of the present invention, up to 16 different reference signal configurations are implemented without increasing dynamic signaling overheads. Therefore, according to the present invention, spatial multiplexing of up to 16 data streams can be supported.

In this embodiment of the present invention, an MU-MIMO configuration is optimized and can support high-rank (more than two layers) MU-MIMO, that is, up to four layers can be used by each user in a multi-user transmission mode (such as the state values 10 and 11 for the dual-codeword transmission in the first group of configuration results). In addition, a solution provided in this embodiment of the present invention can support multi-layer retransmission for MU-MIMO (such as the state values 8 to 15 for the single-codeword transmission for retransmission in the first group of configuration results).

In the present invention, high-rank SU-MIMO and multi-user high-rank MU-MIMO are flexibly configured by sending high-layer signaling to user equipment to change a DMRS configuration manner of the user equipment.

The solution provided in this embodiment of the present invention can increase the quantity of state values of the DMRS configuration without increasing overheads of dynamic signaling that indicates the DMRS configuration, and can further support higher-rank (such as 16-layer or 24-layer) MU-MIMO, so that the spectral efficiency of the system is significantly increased. The present invention also improves MU-MIMO configuration flexibility and resource scheduling effectiveness.

Figure 4:
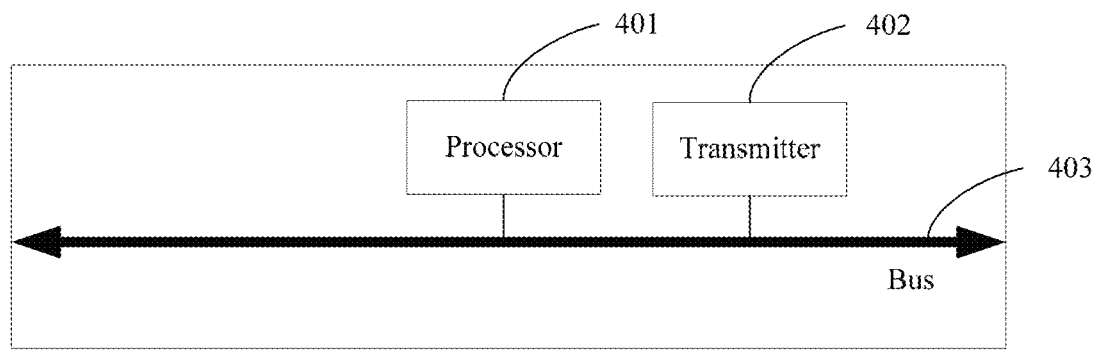
FIG. 4 shows a reference signal configuration device according to an embodiment of the present invention.

FIG. 4 shows a reference signal configuration device according to an embodiment of the present invention. As shown in FIG. 4, corresponding to the foregoing method embodiment, the reference signal configuration device provided in this embodiment of the present invention includes a processor 401, a transmitter 402, and a bus 403. The processor 401 and the transmitter 402 are connected by using the bus 403, to perform data transmission.

The processor 401 is configured to generate control signaling carrying configuration information of a reference signal.

The configuration information of the reference signal includes a configuration mode field and a configuration parameter field.

The configuration mode field is used to indicate a reference signal configuration mode, and the configuration mode includes a dual-codeword transmission mode and two single-codeword transmission modes.

The configuration parameter field is used to indicate a reference signal configuration parameter.

In different configuration modes, the configuration parameter field indicates different reference signal configuration parameters.

The transmitter 402 is configured to send the control signaling.

Further, the device may further include a memory. The memory is configured to store an instruction or a program that is required when the processor 401 performs an operation.

Some technical characteristics in the foregoing device embodiment, such as the reference signal, the configuration mode, the configuration parameter, the single-codeword transmission, and the dual-codeword transmission, are similar to or corresponding to some technical characteristics in the foregoing method embodiment, and details are not repeated herein.

Figure 5:
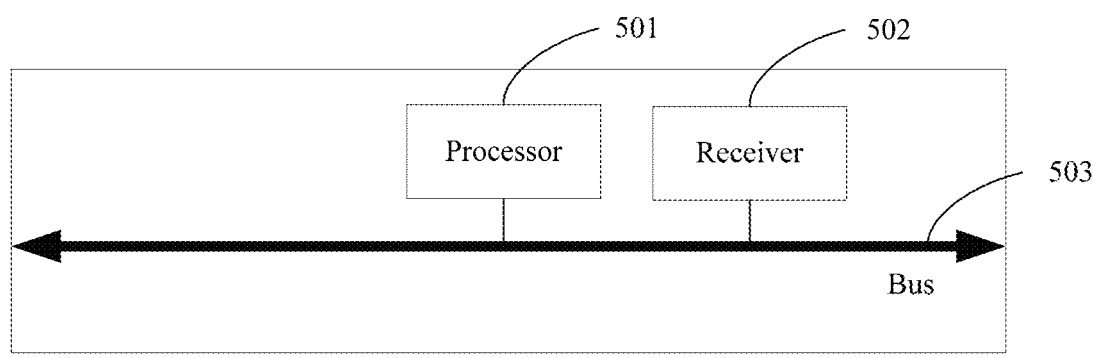
FIG. 5 shows another reference signal configuration device according to an embodiment of the present invention.

FIG. 5 shows another reference signal configuration device according to an embodiment of the present invention. As shown in FIG. 5, corresponding to the foregoing method embodiment, the another reference signal configuration device provided in this embodiment of the present invention includes a processor 501, a receiver 502, and a bus 503. The processor 501 and the receiver 502 are connected by using the bus 503, to perform data transmission.

The receiver 502 is configured to receive control signaling carrying configuration information of a reference signal.

The configuration information of the reference signal includes a configuration mode field and a configuration parameter field.

The configuration mode field is used to indicate a reference signal configuration mode, and the configuration mode includes a dual-codeword transmission mode and two single-codeword transmission modes.

The configuration parameter field is used to indicate a reference signal configuration parameter.

In different configuration modes, the configuration parameter field indicates different reference signal configuration parameters.

The processor 501 is configured to process the control signaling.

Further, the device may further include a memory. The memory is configured to store an instruction or a program that is required when the processor 501 performs an operation.

Some technical characteristics in the foregoing device embodiment, such as the reference signal, the configuration mode, the configuration parameter, the single-codeword transmission, and the dual-codeword transmission, are similar to or corresponding to some technical characteristics in the foregoing method embodiment, and details are not repeated herein.

Although the present invention has been described in specific embodiments, it should be understood that these embodiments should not be construed as a limitation on the present invention, and the present invention should be interpreted according to the claims.

What is claimed is:

1. A reference signal configuration method, comprising generating control signaling carrying reference signal configuration information indicating a configuration of a reference signal, wherein the reference signal configuration information comprises a configuration mode field, the configuration mode field indicating a reference signal configuration mode through a redundancy version, and the configuration mode being one of the following two configuration modes: a first single-codeword transmission mode or a second single-codeword transmission mode, wherein the configuration mode field comprises at least one of a first new data indicator (NDI) or a second NDI, wherein the first NDI is configured to distinguish between the first single-codeword transmission mode and the second single-codeword transmission mode; or the second NDI is configured to distinguish between the first single-codeword transmission mode and the second single-codeword transmission mode; and sending the control signaling.

2. The reference signal configuration method according to claim 1, wherein the reference signal configuration information further comprises a configuration parameter field;

the configuration parameter field is used to indicate a state value of the reference signal; and the state value of the reference signal corresponds to at least one of a data transmission layer quantity, an antenna port, or a scrambling identity of the reference signal.

3. The reference signal configuration method according to claim 1, wherein the configuration mode field further comprises a modulation and coding scheme (MCS) and a redundancy version (RV), when MCS=0 and RV=1, the configuration mode field indicates single-codeword transmission, when MCS≠0 or RV≠1, the configuration mode field indicates dual-codeword transmission, and the configuration mode is one of the following three configuration modes: a dual-codeword transmission mode, the first single-codeword transmission mode, or the second single-codeword transmission mode; and state values in the three configuration modes indicate a group of configuration results, and there are three groups of configuration results, wherein NDI1 indicates the first NDI, NDI2 indicates the second NDI, $n_{SCID}$ indicates an initial value code of a scrambling identity, and OCC indicates an orthogonal cover code;

the following table lists a first group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID}$ = 0 (OCC = 4) | 0 | 1 layer, antenna port 7, $n_{SCID}$ = 0 (OCC = 4) | 0 | 2 layers, antenna ports 7 and 8, $n_{SCID}$ = 0 (OCC = 4) |
| 1 | 1 layer, antenna port 7, $n_{SCID}$ = 1 (OCC = 4) | 1 | 1 layer, antenna port 7, $n_{SCID}$ = 1 (OCC = 4) | 1 | 2 layers, antenna ports 7 and 8, $n_{SCID}$ = 1 (OCC = 4) |

-continued

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 2 | 1 layer, antenna port 8, $n_{SCID} = 0$ (OCC = 4) | 2 | 1 layer, antenna port 8, $n_{SCID} = 0$ (OCC = 4) | 2 | 2 layers, antenna ports 11 and 13, $n_{SCID} = 0$ (OCC = 4) |
| 3 | 1 layer, antenna port 8, $n_{SCID} = 1$ (OCC = 4) | 3 | 1 layer, antenna port 8, $n_{SCID} = 1$ (OCC = 4) | 3 | 2 layers, antenna ports 11 and 13, $n_{SCID} = 1$ (OCC = 4) |
| 4 | 1 layer, antenna port 11, $n_{SCID} = 0$ (OCC = 4) | 4 | 1 layer, antenna port 11, $n_{SCID} = 0$ (OCC = 4) | 4 | 2 layers, antenna ports 9 and 10, $n_{SCID} = 0$ (OCC = 4) |
| 5 | 1 layer, antenna port 11, $n_{SCID} = 1$ (OCC = 4) | 5 | 1 layer, antenna port 11, $n_{SCID} = 1$ (OCC = 4) | 5 | 2 layers, antenna ports 9 and 10, $n_{SCID} = 1$ (OCC = 4) |
| 6 | 1 layer, antenna port 13, $n_{SCID} = 0$ (OCC = 4) | 6 | 1 layer, antenna port 13, $n_{SCID} = 0$ (OCC = 4) | 6 | 2 layers, antenna ports 12 and 14, $n_{SCID} = 0$ (OCC = 4) |
| 7 | 1 layer, antenna port 13, $n_{SCID} = 1$ (OCC = 4) | 7 | 1 layer, antenna port 13, $n_{SCID} = 1$ (OCC = 4) | 7 | 2 layers, antenna ports 12 and 14, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) | 8 | 3 layers, antenna ports 7 to 9, $n_{SCID} = 0$ (OCC = 4) |
| 9 | 1 layer, antenna port 9, $n_{SCID} = 1$ (OCC = 4) | 9 | 2 layers, antenna ports 9 and 10, $n_{SCID} = 0$ (OCC = 4) | 9 | 3 layers, antenna ports 7 to 9, $n_{SCID} = 1$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) | 10 | 4 layers, antenna ports 7 to 10, $n_{SCID} = 0$ (OCC = 4) |
| 11 | 1 layer, antenna port 10, $n_{SCID} = 1$ (OCC = 4) | 11 | 2 layers, antenna ports 12 and 14, $n_{SCID} = 0$ (OCC = 4) | 11 | 4 layers, antenna ports 7 to 10, $n_{SCID} = 1$ (OCC = 4) |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 5 layers, antenna ports 7 to 11 |
| 13 | 1 layer, antenna port 12, $n_{SCID} = 1$ (OCC = 4) | 13 | 3 layers, antenna ports 12 to 14, $n_{SCID} = 0$ (OCC = 4) | 13 | 6 layers, antenna ports 7 to 12 |
| 14 | 1 layer, antenna port 14, $n_{SCID} = 0$ (OCC = 4) | 14 | 4 layers, antenna ports 7 to 10, $n_{SCID} = 0$ (OCC = 4) | 14 | 7 layers, antenna ports 7 to 13 |
| 15 | 1 layer, antenna port 14, $n_{SCID} = 1$ (OCC = 4) | 15 | 4 layers, antenna ports 11 to 14, $n_{SCID} = 0$ (OCC = 4) | 15 | 8 layers, antenna ports 7 to 14; | the following table lists a second group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID} = 0$ (OCC = 4) | 0 | 1 layer, antenna port 7, $n_{SCID} = 0$ (OCC = 4) | 0 | 2 layers, antenna ports 7 and 8, $n_{SCID} = 0$ (OCC = 4) |
| 1 | 1 layer, antenna port 7, $n_{SCID} = 1$ (OCC = 4) | 1 | 1 layer, antenna port 7, $n_{SCID} = 1$ (OCC = 4) | 1 | 2 layers, antenna ports 7 and 8, $n_{SCID} = 1$ (OCC = 4) |
| 2 | 1 layer, antenna port 8, $n_{SCID} = 0$ (OCC = 4) | 2 | 1 layer, antenna port 8, $n_{SCID} = 0$ (OCC = 4) | 2 | 2 layers, antenna ports 11 and 13, $n_{SCID} = 0$ (OCC = 4) |
| 3 | 1 layer, antenna port 8, $n_{SCID} = 1$ (OCC = 4) | 3 | 1 layer, antenna port 8, $n_{SCID} = 1$ (OCC = 4) | 3 | 2 layers, antenna ports 11 and 13, $n_{SCID} = 1$ (OCC = 4) |
| 4 | 1 layer, antenna port 11, $n_{SCID} = 0$ (OCC = 4) | 4 | 1 layer, antenna port 11, $n_{SCID} = 0$ (OCC = 4) | 4 | 2 layers, antenna ports 9 and 10, $n_{SCID} = 0$ (OCC = 4) |
| 5 | 1 layer, antenna port 11, $n_{SCID} = 1$ (OCC = 4) | 5 | 1 layer, antenna port 11, $n_{SCID} = 1$ (OCC = 4) | 5 | 2 layers, antenna ports 9 and 10, $n_{SCID} = 1$ (OCC = 4) |
| 6 | 1 layer, antenna port 13, $n_{SCID} = 0$ (OCC = 4) | 6 | 1 layer, antenna port 13, $n_{SCID} = 0$ (OCC = 4) | 6 | 2 layers, antenna ports 12 and 14, $n_{SCID} = 0$ (OCC = 4) |
| 7 | 1 layer, antenna port 13, $n_{SCID} = 1$ (OCC = 4) | 7 | 1 layer, antenna port 13, $n_{SCID} = 1$ (OCC = 4) | 7 | 2 layers, antenna ports 12 and 14, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) | 8 | 3 layers, antenna ports 7 to 9, $n_{SCID} = 0$ (OCC = 4) |

-continued

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 9 | 1 layer, antenna port 9, $n_{SCID} = 1$ (OCC = 4) | 9 | 2 layers, antenna ports 9 and 10, $n_{SCID} = 0$ (OCC = 4) | 9 | 3 layers, antenna ports 7 to 9, $n_{SCID} = 1$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) | 10 | 3 layers, antenna ports 12 to 14, $n_{SCID} = 0$ (OCC = 4) |
| 11 | 1 layer, antenna port 10, $n_{SCID} = 1$ (OCC = 4) | 11 | 2 layers, antenna ports 12 and 14, $n_{SCID} = 0$ (OCC = 4) | 11 | 3 layers, antenna ports 12 to 14, $n_{SCID} = 1$ (OCC = 4) |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 4 layers, antenna ports 7 to 10, $n_{SCID} = 0$ (OCC = 4) |
| 13 | 1 layer, antenna port 12, $n_{SCID} = 1$ (OCC = 4) | 13 | 3 layers, antenna ports 12 to 14, $n_{SCID} = 0$ (OCC = 4) | 13 | 4 layers, antenna ports 7 to 10, $n_{SCID} = 1$ (OCC = 4) |
| 14 | 1 layer, antenna port 14, $n_{SCID} = 0$ (OCC = 4) | 14 | 4 layers, antenna ports 7 to 10, $n_{SCID} = 0$ (OCC = 4) | 14 | 4 layers, antenna ports 11 to 14, $n_{SCID} = 0$ (OCC = 4) |
| 15 | 1 layer, antenna port 14, $n_{SCID} = 1$ (OCC = 4) | 15 | 4 layers, antenna ports 11 to 14, $n_{SCID} = 0$ (OCC = 4) | 15 | 4 layers, antenna ports 11 to 14, $n_{SCID} = 1$ (OCC = 4); | and
the following table lists a third group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID} = 0$ (OCC = 4) | 0 | 1 layer, antenna port 7, $n_{SCID} = x$ (OCC = 4) | 0 | 2 layers, antenna ports 7 and 8, $n_{SCID} = 0$ (OCC = 4) |
| 1 | 1 layer, antenna port 7, $n_{SCID} = 1$ (OCC = 4) | 1 | 1 layer, antenna port 8, $n_{SCID} = x$ (OCC = 4) | 1 | 2 layers, antenna ports 7 and 8, $n_{SCID} = 1$ (OCC = 4) |
| 2 | 1 layer, antenna port 8, $n_{SCID} = 0$ (OCC = 4) | 2 | 1 layer, antenna port 11, $n_{SCID} = x$ (OCC = 4) | 2 | 2 layers, antenna ports 7 and 8, $n_{SCID} = x$ (OCC = 4) |
| 3 | 1 layer, antenna port 8, $n_{SCID} = 1$ (OCC = 4) | 3 | 1 layer, antenna port 13, $n_{SCID} = x$ (OCC = 4) | 3 | 2 layers, antenna ports 11 and 13, $n_{SCID} = 0$ (OCC = 4) |
| 4 | 1 layer, antenna port 11, $n_{SCID} = 0$ (OCC = 4) | 4 | 1 layer, antenna port 9, $n_{SCID} = x$ (OCC = 4) | 4 | 2 layers, antenna ports 11 and 13, $n_{SCID} = 1$ (OCC = 4) |
| 5 | 1 layer, antenna port 11, $n_{SCID} = 1$ (OCC = 4) | 5 | 1 layer, antenna port 10, $n_{SCID} = x$ (OCC = 4) | 5 | 2 layers, antenna ports 11 and 13, $n_{SCID} = x$ (OCC = 4) |
| 6 | 1 layer, antenna port 13, $n_{SCID} = 0$ (OCC = 4) | 6 | 1 layer, antenna port 12, $n_{SCID} = x$ (OCC = 4) | 6 | 2 layers, antenna ports 9 and 10, $n_{SCID} = 0$ (OCC = 4) |
| 7 | 1 layer, antenna port 13, $n_{SCID} = 1$ (OCC = 4) | 7 | 1 layer, antenna port 14, $n_{SCID} = x$ (OCC = 4) | 7 | 2 layers, antenna ports 9 and 10, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) | 8 | 2 layers, antenna ports 9 and 10, $n_{SCID} = x$ (OCC = 4) |
| 9 | 1 layer, antenna port 9, $n_{SCID} = 1$ (OCC = 4) | 9 | 2 layers, antenna ports 7 and 8, $n_{SCID} = 1$ (OCC = 4) | 9 | 2 layers, antenna ports 12 and 14, $n_{SCID} = 0$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) | 10 | 2 layers, antenna ports 12 and 14, $n_{SCID} = 1$ (OCC = 4) |
| 11 | 1 layer, antenna port 10, $n_{SCID} = 1$ (OCC = 4) | 11 | 2 layers, antenna ports 11 and 13, $n_{SCID} = 1$ (OCC = 4) | 11 | 2 layers, antenna ports 12 and 14, $n_{SCID} = x$ (OCC = 4) |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 3 layers, antenna ports 7 to 9 |
| 13 | 1 layer, antenna port 12, $n_{SCID} = 1$ (OCC = 4) | 13 | 3 layers, antenna ports 7 to 9, $n_{SCID} = 1$ (OCC = 4) | 13 | 4 layers, antenna ports 7 to 10 |

-continued

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 14 | 1 layer, antenna port 14, $n_{SCID} = 0$ (OCC = 4) | 14 | 3 layers, antenna ports 12 to 14, $n_{SCID} = 0$ (OCC = 4) | 14 | 5 layers, antenna ports 7 to 11 |
| 15 | 1 layer, antenna port 14, $n_{SCID} = 1$ (OCC = 4) | 15 | 3 layers, antenna ports 12 to 14, $n_{SCID} = 1$ (OCC = 4) | 15 | 6 layers, antenna ports 7 to 12. |

4. The reference signal configuration method according to claim 3, wherein the reference signal configuration method further comprises:
sending radio resource control signaling, wherein the radio resource control signaling carries configuration result indication information, and the configuration result indication information is used to indicate that a current reference signal configuration switches between the first group of configuration results, the second group of configuration results, and the third group of configuration results.

5. A reference signal configuration method, comprising:
receiving control signaling carrying reference signal configuration information indicating a configuration of a reference signal, wherein
the reference signal configuration information comprises a configuration mode field, the configuration mode field indicating a reference signal configuration mode through a redundancy version, and the configuration mode being one of the following two configuration modes: a first single-codeword transmission mode or a second single-codeword transmission mode, wherein the configuration mode field comprises at least one of a first new data indicator (NDI) or a second NDI, wherein
the first NDI is configured for distinguishing between the first single-codeword transmission mode and the second single-codeword transmission mode; or
the second NDI is configured for distinguishing between the first single-codeword transmission mode and the second single-codeword transmission mode; and
processing the control signaling.

6. The reference signal configuration method according to claim 5, wherein
the reference signal configuration information further comprises a configuration parameter field;
the configuration parameter field is used to indicate a state value of the reference signal; and
the state value of the reference signal to at least one of a data transmission layer quantity, an antenna port, or a scrambling identity of the reference signal.

7. The reference signal configuration method according to claim 5, wherein
the configuration mode field further comprises a modulation and coding scheme (MCS) and a redundancy version (RV), when MCS=0 and RV=1, the configuration mode field indicates single-codeword transmission, when MCS≠0 or RV≠1, the configuration mode field indicates dual-codeword transmission, and the configuration mode is one of the following three configuration modes: a dual-codeword transmission mode, the first single-codeword transmission mode, or the second single-codeword transmission mode; and
state values in the three configuration modes indicate a group of configuration results, and there are three groups of configuration results, wherein
NDI1 indicates the first NDI, NDI2 indicates the second NDI, $n_{SCID}$ indicates an initial value code of a scrambling identity, and OCC indicates an orthogonal cover code;
the following table lists a first group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID} = 0$ (OCC = 4) | 0 | 1 layer, antenna port 7, $n_{SCID} = 0$ (OCC = 4) | 0 | 2 layers, antenna ports 7 and 8, $n_{SCID} = 0$ (OCC = 4) |
| 1 | 1 layer, antenna port 7, $n_{SCID} = 1$ (OCC = 4) | 1 | 1 layer, antenna port 7, $n_{SCID} = 1$ (OCC = 4) | 1 | 2 layers, antenna ports 7 and 8, $n_{SCID} = 1$ (OCC = 4) |
| 2 | 1 layer, antenna port 8, $n_{SCID} = 0$ (OCC = 4) | 2 | 1 layer, antenna port 8, $n_{SCID} = 0$ (OCC = 4) | 2 | 2 layers, antenna ports 11 and 13, $n_{SCID} = 0$ (OCC = 4) |
| 3 | 1 layer, antenna port 8, $n_{SCID} = 1$ (OCC = 4) | 3 | 1 layer, antenna port 8, $n_{SCID} = 1$ (OCC = 4) | 3 | 2 layers, antenna ports 11 and 13, $n_{SCID} = 1$ (OCC = 4) |
| 4 | 1 layer, antenna port 11, $n_{SCID} = 0$ (OCC = 4) | 4 | 1 layer, antenna port 11, $n_{SCID} = 0$ (OCC = 4) | 4 | 2 layers, antenna ports 9 and 10, $n_{SCID} = 0$ (OCC = 4) |
| 5 | 1 layer, antenna port 11, $n_{SCID} = 1$ (OCC = 4) | 5 | 1 layer, antenna port 11, $n_{SCID} = 1$ (OCC = 4) | 5 | 2 layers, antenna ports 9 and 10, $n_{SCID} = 1$ (OCC = 4) |

-continued

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 6 | 1 layer, antenna port 13, $n_{SCID} = 0$ (OCC = 4) | 6 | 1 layer, antenna port 13, $n_{SCID} = 0$ (OCC = 4) | 6 | 2 layers, antenna ports 12 and 14, $n_{SCID} = 0$ (OCC = 4) |
| 7 | 1 layer, antenna port 13, $n_{SCID} = 1$ (OCC = 4) | 7 | 1 layer, antenna port 13, $n_{SCID} = 1$ (OCC = 4) | 7 | 2 layers, antenna ports 12 and 14, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) | 8 | 3 layers, antenna ports 7 to 9, $n_{SCID} = 0$ (OCC = 4) |
| 9 | 1 layer, antenna port 9, $n_{SCID} = 1$ (OCC = 4) | 9 | 2 layers, antenna ports 9 and 10, $n_{SCID} = 0$ (OCC = 4) | 9 | 3 layers, antenna ports 7 to 9, $n_{SCID} = 1$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) | 10 | 4 layers, antenna ports 7 to 10, $n_{SCID} = 0$ (OCC = 4) |
| 11 | 1 layer, antenna port 10, $n_{SCID} = 1$ (OCC = 4) | 11 | 2 layers, antenna ports 12 and 14, $n_{SCID} = 0$ (OCC = 4) | 11 | 4 layers, antenna ports 7 to 10, $n_{SCID} = 1$ (OCC = 4) |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 5 layers, antenna ports 7 to 11 |
| 13 | 1 layer, antenna port 12, $n_{SCID} = 1$ (OCC = 4) | 13 | 3 layers, antenna ports 12 to 14, $n_{SCID} = 0$ (OCC = 4) | 13 | 6 layers, antenna ports 7 to 12 |
| 14 | 1 layer, antenna port 14, $n_{SCID} = 0$ (OCC = 4) | 14 | 4 layers, antenna ports 7 to 10, $n_{SCID} = 0$ (OCC = 4) | 14 | 7 layers, antenna ports 7 to 13 |
| 15 | 1 layer, antenna port 14, $n_{SCID} = 1$ (OCC = 4) | 15 | 4 layers, antenna ports 11 to 14, $n_{SCID} = 0$ (OCC = 4) | 15 | 8 layers, antenna ports 7 to 14; | the following table lists a second group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID} = 0$ (OCC = 4) | 0 | 1 layer, antenna port 7, $n_{SCID} = 0$ (OCC = 4) | 0 | 2 layers, antenna ports 7 and 8, $n_{SCID} = 0$ (OCC = 4) |
| 1 | 1 layer, antenna port 7, $n_{SCID} = 1$ (OCC = 4) | 1 | 1 layer, antenna port 7, $n_{SCID} = 1$ (OCC = 4) | 1 | 2 layers, antenna ports 7 and 8, $n_{SCID} = 1$ (OCC = 4) |
| 2 | 1 layer, antenna port 8, $n_{SCID} = 0$ (OCC = 4) | 2 | 1 layer, antenna port 8, $n_{SCID} = 0$ (OCC = 4) | 2 | 2 layers, antenna ports 11 and 13, $n_{SCID} = 0$ (OCC = 4) |
| 3 | 1 layer, antenna port 8, $n_{SCID} = 1$ (OCC = 4) | 3 | 1 layer, antenna port 8, $n_{SCID} = 1$ (OCC = 4) | 3 | 2 layers, antenna ports 11 and 13, $n_{SCID} = 1$ (OCC = 4) |
| 4 | 1 layer, antenna port 11, $n_{SCID} = 0$ (OCC = 4) | 4 | 1 layer, antenna port 11, $n_{SCID} = 0$ (OCC = 4) | 4 | 2 layers, antenna ports 9 and 10, $n_{SCID} = 0$ (OCC = 4) |
| 5 | 1 layer, antenna port 11, $n_{SCID} = 1$ (OCC = 4) | 5 | 1 layer, antenna port 11, $n_{SCID} = 1$ (OCC = 4) | 5 | 2 layers, antenna ports 9 and 10, $n_{SCID} = 1$ (OCC = 4) |
| 6 | 1 layer, antenna port 13, $n_{SCID} = 0$ (OCC = 4) | 6 | 1 layer, antenna port 13, $n_{SCID} = 0$ (OCC = 4) | 6 | 2 layers, antenna ports 12 and 14, $n_{SCID} = 0$ (OCC = 4) |
| 7 | 1 layer, antenna port 13, $n_{SCID} = 1$ (OCC = 4) | 7 | 1 layer, antenna port 13, $n_{SCID} = 1$ (OCC = 4) | 7 | 2 layers, antenna ports 12 and 14, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) | 8 | 3 layers, antenna ports 7 to 9, $n_{SCID} = 0$ (OCC = 4) |
| 9 | 1 layer, antenna port 9, $n_{SCID} = 1$ (OCC = 4) | 9 | 2 layers, antenna ports 9 and 10, $n_{SCID} = 0$ (OCC = 4) | 9 | 3 layers, antenna ports 7 to 9, $n_{SCID} = 1$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) | 10 | 3 layers, antenna ports 12 to 14, $n_{SCID} = 0$ (OCC = 4) |
| 11 | 1 layer, antenna port 10, $n_{SCID} = 1$ (OCC = 4) | 11 | 2 layers, antenna ports 12 and 14, $n_{SCID} = 0$ (OCC = 4) | 11 | 3 layers, antenna ports 12 to 14, $n_{SCID} = 1$ (OCC = 4) |

-continued

| | Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission |
|---|---|---|---|---|---|
| State value | Meaning | State value | Meaning | State value | Meaning |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 4 layers, antenna ports 7 to 10, $n_{SCID} = 0$ (OCC = 4) |
| 13 | 1 layer, antenna port 12, $n_{SCID} = 1$ (OCC = 4) | 13 | 3 layers, antenna ports 12 to 14, $n_{SCID} = 0$ (OCC = 4) | 13 | 4 layers, antenna ports 7 to 10, $n_{SCID} = 1$ (OCC = 4) |
| 14 | 1 layer, antenna port 14, $n_{SCID} = 0$ (OCC = 4) | 14 | 4 layers, antenna ports 7 to 10, $n_{SCID} = 0$ (OCC = 4) | 14 | 4 layers, antenna ports 11 to 14, $n_{SCID} = 0$ (OCC = 4) |
| 15 | 1 layer, antenna port 14, $n_{SCID} = 1$ (OCC = 4) | 15 | 4 layers, antenna ports 11 to 14, $n_{SCID} = 0$ (OCC = 4) | 15 | 4 layers, antenna ports 11 to 14, $n_{SCID} = 1$ (OCC = 4); | and
the following table lists a third group of configuration results:

| | Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission |
|---|---|---|---|---|---|
| State value | Meaning | State value | Meaning | State value | Meaning |
| 0 | 1 layer, antenna port 7, $n_{SCID} = 0$ (OCC = 4) | 0 | 1 layer, antenna port 7, $n_{SCID} = x$ (OCC = 4) | 0 | 2 layers, antenna ports 7 and 8, $n_{SCID} = 0$ (OCC = 4) |
| 1 | 1 layer, antenna port 7, $n_{SCID} = 1$ (OCC = 4) | 1 | 1 layer, antenna port 8, $n_{SCID} = x$ (OCC = 4) | 1 | 2 layers, antenna ports 7 and 8, $n_{SCID} = 1$ (OCC = 4) |
| 2 | 1 layer, antenna port 8, $n_{SCID} = 0$ (OCC = 4) | 2 | 1 layer, antenna port 11, $n_{SCID} = x$ (OCC = 4) | 2 | 2 layers, antenna ports 7 and 8, $n_{SCID} = x$ (OCC = 4) |
| 3 | 1 layer, antenna port 8, $n_{SCID} = 1$ (OCC = 4) | 3 | 1 layer, antenna port 13, $n_{SCID} = x$ (OCC = 4) | 3 | 2 layers, antenna ports 11 and 13, $n_{SCID} = 0$ (OCC = 4) |
| 4 | 1 layer, antenna port 11, $n_{SCID} = 0$ (OCC = 4) | 4 | 1 layer, antenna port 9, $n_{SCID} = x$ (OCC = 4) | 4 | 2 layers, antenna ports 11 and 13, $n_{SCID} = 1$ (OCC = 4) |
| 5 | 1 layer, antenna port 11, $n_{SCID} = 1$ (OCC = 4) | 5 | 1 layer, antenna port 10, $n_{SCID} = x$ (OCC = 4) | 5 | 2 layers, antenna ports 11 and 13, $n_{SCID} = x$ (OCC = 4) |
| 6 | 1 layer, antenna port 13, $n_{SCID} = 0$ (OCC = 4) | 6 | 1 layer, antenna port 12, $n_{SCID} = x$ (OCC = 4) | 6 | 2 layers, antenna ports 9 and 10, $n_{SCID} = 0$ (OCC = 4) |
| 7 | 1 layer, antenna port 13, $n_{SCID} = 1$ (OCC = 4) | 7 | 1 layer, antenna port 14, $n_{SCID} = x$ (OCC = 4) | 7 | 2 layers, antenna ports 9 and 10, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) | 8 | 2 layers, antenna ports 9 and 10, $n_{SCID} = x$ (OCC = 4) |
| 9 | 1 layer, antenna port 9, $n_{SCID} = 1$ (OCC = 4) | 9 | 2 layers, antenna ports 7 and 8, $n_{SCID} = 1$ (OCC = 4) | 9 | 2 layers, antenna ports 12 and 14, $n_{SCID} = 0$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) | 10 | 2 layers, antenna ports 12 and 14, $n_{SCID} = 1$ (OCC = 4) |
| 11 | 1 layer, antenna port 10, $n_{SCID} = 1$ (OCC = 4) | 11 | 2 layers, antenna ports 11 and 13, $n_{SCID} = 1$ (OCC = 4) | 11 | 2 layers, antenna ports 12 and 14, $n_{SCID} = x$ (OCC = 4) |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 3 layers, antenna ports 7 to 9 |
| 13 | 1 layer, antenna port 12, $n_{SCID} = 1$ (OCC = 4) | 13 | 3 layers, antenna ports 7 to 9, $n_{SCID} = 1$ (OCC = 4) | 13 | 4 layers, antenna ports 7 to 10 |
| 14 | 1 layer, antenna port 14, $n_{SCID} = 0$ (OCC = 4) | 14 | 3 layers, antenna ports 12 to 14, $n_{SCID} = 0$ (OCC = 4) | 14 | 5 layers, antenna ports 7 to 11 |
| 15 | 1 layer, antenna port 14, $n_{SCID} = 1$ (OCC = 4) | 15 | 3 layers, antenna ports 12 to 14, $n_{SCID} = 1$ (OCC = 4) | 15 | 6 layers, antenna ports 7 to 12. |

8. The reference signal configuration method according to claim 7, wherein the reference signal configuration method further comprises:
sending radio resource control signaling, wherein the radio resource control signaling carries configuration result indication information, and the configuration result indication information is used to indicate that a current reference signal configuration switches between the first group of configuration results, the second group of configuration results, and the third group of configuration results.

9. A reference signal configuration device, comprising: a processor, a transmitter, and a bus, wherein the processor and the transmitter are connected by using the bus, to perform data transmission;
the processor is configured to generate control signaling carrying reference signal configuration information indicating a configuration of a reference signal, wherein
the reference signal configuration information comprises a configuration mode field, the configuration mode field indicating a reference signal configuration mode through a redundancy version, and the configuration mode being one of the following two configuration modes: a first single-codeword transmission mode or a second single-codeword transmission mode, wherein
the configuration mode field comprises at least one of a first new data indicator (NDI) or a second NDI, wherein
the first NDI is used to distinguish between the first single-codeword transmission mode and the second single-codeword transmission mode; or
the second NDI is used to distinguish between the first single-codeword transmission mode and the second single-codeword transmission mode; and
the transmitter is configured to send the control signaling.

10. The reference signal configuration device according to claim 9, wherein
the reference signal configuration information further comprises a configuration parameter field;
the configuration parameter field is used to indicate a state value of the reference signal; and
the state value of the reference signal corresponds to at least one of a data transmission layer quantity, an antenna port, or a scrambling identity of the reference signal.

11. The reference signal configuration device according to claim 9, wherein
the configuration mode field further comprises a modulation and coding scheme (MCS) and a redundancy version (RV), when MCS=0 and RV=1, the configuration mode field indicates single-codeword transmission, when MCS≠0 or RV≠1, the configuration mode field indicates dual-codeword transmission, and the configuration mode is one of the following three configuration modes: a dual-codeword transmission mode, the first single-codeword transmission mode, or the second single-codeword transmission mode; and
state values in the three configuration modes indicate a group of configuration results, and there are three groups of configuration results, wherein
NDI1 indicates the first NDI, NDI2 indicates the second NDI, $n_{SCID}$ indicates an initial value code of a scrambling identity, and OCC indicates an orthogonal cover code;
the following table lists a first group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID}$ = 0 (OCC = 4) | 0 | 1 layer, antenna port 7, $n_{SCID}$ = 0 (OCC = 4) | 0 | 2 layers, antenna ports 7 and 8, $n_{SCID}$ = 0 (OCC = 4) |
| 1 | 1 layer, antenna port 7, $n_{SCID}$ = 1 (OCC = 4) | 1 | 1 layer, antenna port 7, $n_{SCID}$ = 1 (OCC = 4) | 1 | 2 layers, antenna ports 7 and 8, $n_{SCID}$ = 1 (OCC = 4) |
| 2 | 1 layer, antenna port 8, $n_{SCID}$ = 0 (OCC = 4) | 2 | 1 layer, antenna port 8, $n_{SCID}$ = 0 (OCC = 4) | 2 | 2 layers, antenna ports 11 and 13, $n_{SCID}$ = 0 (OCC = 4) |
| 3 | 1 layer, antenna port 8, $n_{SCID}$ = 1 (OCC = 4) | 3 | 1 layer, antenna port 8, $n_{SCID}$ = 1 (OCC = 4) | 3 | 2 layers, antenna ports 11 and 13, $n_{SCID}$ = 1 (OCC = 4) |
| 4 | 1 layer, antenna port 11, $n_{SCID}$ = 0 (OCC = 4) | 4 | 1 layer, antenna port 11, $n_{SCID}$ = 0 (OCC = 4) | 4 | 2 layers, antenna ports 9 and 10, $n_{SCID}$ = 0 (OCC = 4) |
| 5 | 1 layer, antenna port 11, $n_{SCID}$ = 1 (OCC = 4) | 5 | 1 layer, antenna port 11, $n_{SCID}$ = 1 (OCC = 4) | 5 | 2 layers, antenna ports 9 and 10, $n_{SCID}$ = 1 (OCC = 4) |
| 6 | 1 layer, antenna port 13, $n_{SCID}$ = 0 (OCC = 4) | 6 | 1 layer, antenna port 13, $n_{SCID}$ = 0 (OCC = 4) | 6 | 2 layers, antenna ports 12 and 14, $n_{SCID}$ = 0 (OCC = 4) |
| 7 | 1 layer, antenna port 13, $n_{SCID}$ = 1 (OCC = 4) | 7 | 1 layer, antenna port 13, $n_{SCID}$ = 1 (OCC = 4) | 7 | 2 layers, antenna ports 12 and 14, $n_{SCID}$ = 1 (OCC = 4) |
| 8 | 1 layer, antenna port 9, $n_{SCID}$ = 0 (OCC = 4) | 8 | 2 layers, antenna ports 7 and 8, $n_{SCID}$ = 0 (OCC = 4) | 8 | 3 layers, antenna ports 7 to 9, $n_{SCID}$ = 0 (OCC = 4) |
| 9 | 1 layer, antenna port 9, $n_{SCID}$ = 1 (OCC = 4) | 9 | 2 layers, antenna ports 9 and 10, $n_{SCID}$ = 0 (OCC = 4) | 9 | 3 layers, antenna ports 7 to 9, $n_{SCID}$ = 1 (OCC = 4) |
| 10 | 1 layer, antenna port 10, $n_{SCID}$ = 0 (OCC = 4) | 10 | 2 layers, antenna ports 11 and 13, $n_{SCID}$ = 0 (OCC = 4) | 10 | 4 layers, antenna ports 7 to 10, $n_{SCID}$ = 0 (OCC = 4) |
| 11 | 1 layer, antenna port 10, $n_{SCID}$ = 1 (OCC = 4) | 11 | 2 layers, antenna ports 12 and 14, $n_{SCID}$ = 0 (OCC = 4) | 11 | 4 layers, antenna ports 7 to 10, $n_{SCID}$ = 1 (OCC = 4) |

-continued

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 5 layers, antenna ports 7 to 11 |
| 13 | 1 layer, antenna port 12, $n_{SCID} = 1$ (OCC = 4) | 13 | 3 layers, antenna ports 12 to 14, $n_{SCID} = 0$ (OCC = 4) | 13 | 6 layers, antenna ports 7 to 12 |
| 14 | 1 layer, antenna port 14, $n_{SCID} = 0$ (OCC = 4) | 14 | 4 layers, antenna ports 7 to 10, $n_{SCID} = 0$ (OCC = 4) | 14 | 7 layers, antenna ports 7 to 13 |
| 15 | 1 layer, antenna port 14, $n_{SCID} = 1$ (OCC = 4) | 15 | 4 layers, antenna ports 11 to 14, $n_{SCID} = 0$ (OCC = 4) | 15 | 8 layers, antenna ports 7 to 14; | the following table lists a second group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID} = 0$ (OCC = 4) | 0 | 1 layer, antenna port 7, $n_{SCID} = 0$ (OCC = 4) | 0 | 2 layers, antenna ports 7 and 8, $n_{SCID} = 0$ (OCC = 4) |
| 1 | 1 layer, antenna port 7, $n_{SCID} = 1$ (OCC = 4) | 1 | 1 layer, antenna port 7, $n_{SCID} = 1$ (OCC = 4) | 1 | 2 layers, antenna ports 7 and 8, $n_{SCID} = 1$ (OCC = 4) |
| 2 | 1 layer, antenna port 8, $n_{SCID} = 0$ (OCC = 4) | 2 | 1 layer, antenna port 8, $n_{SCID} = 0$ (OCC = 4) | 2 | 2 layers, antenna ports 11 and 13, $n_{SCID} = 0$ (OCC = 4) |
| 3 | 1 layer, antenna port 8, $n_{SCID} = 1$ (OCC = 4) | 3 | 1 layer, antenna port 8, $n_{SCID} = 1$ (OCC = 4) | 3 | 2 layers, antenna ports 11 and 13, $n_{SCID} = 1$ (OCC = 4) |
| 4 | 1 layer, antenna port 11, $n_{SCID} = 0$ (OCC = 4) | 4 | 1 layer, antenna port 11, $n_{SCID} = 0$ (OCC = 4) | 4 | 2 layers, antenna ports 9 and 10, $n_{SCID} = 0$ (OCC = 4) |
| 5 | 1 layer, antenna port 11, $n_{SCID} = 1$ (OCC = 4) | 5 | 1 layer, antenna port 11, $n_{SCID} = 1$ (OCC = 4) | 5 | 2 layers, antenna ports 9 and 10, $n_{SCID} = 1$ (OCC = 4) |
| 6 | 1 layer, antenna port 13, $n_{SCID} = 0$ (OCC = 4) | 6 | 1 layer, antenna port 13, $n_{SCID} = 0$ (OCC = 4) | 6 | 2 layers, antenna ports 12 and 14, $n_{SCID} = 0$ (OCC = 4) |
| 7 | 1 layer, antenna port 13, $n_{SCID} = 1$ (OCC = 4) | 7 | 1 layer, antenna port 13, $n_{SCID} = 1$ (OCC = 4) | 7 | 2 layers, antenna ports 12 and 14, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) | 8 | 3 layers, antenna ports 7 to 9, $n_{SCID} = 0$ (OCC = 4) |
| 9 | 1 layer, antenna port 9, $n_{SCID} = 1$ (OCC = 4) | 9 | 2 layers, antenna ports 9 and 10, $n_{SCID} = 0$ (OCC = 4) | 9 | 3 layers, antenna ports 7 to 9, $n_{SCID} = 1$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) | 10 | 3 layers, antenna ports 12 to 14, $n_{SCID} = 0$ (OCC = 4) |
| 11 | 1 layer, antenna port 10, $n_{SCID} = 1$ (OCC = 4) | 11 | 2 layers, antenna ports 12 and 14, $n_{SCID} = 0$ (OCC = 4) | 11 | 3 layers, antenna ports 12 to 14, $n_{SCID} = 1$ (OCC = 4) |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 4 layers, antenna ports 7 to 10, $n_{SCID} = 0$ (OCC = 4) |
| 13 | 1 layer, antenna port 12, $n_{SCID} = 1$ (OCC = 4) | 13 | 3 layers, antenna ports 12 to 14, $n_{SCID} = 0$ (OCC = 4) | 13 | 4 layers, antenna ports 7 to 10, $n_{SCID} = 1$ (OCC = 4) |
| 14 | 1 layer, antenna port 14, $n_{SCID} = 0$ (OCC = 4) | 14 | 4 layers, antenna ports 7 to 10, $n_{SCID} = 0$ (OCC = 4) | 14 | 4 layers, antenna ports 11 to 14, $n_{SCID} = 0$ (OCC = 4) |
| 15 | 1 layer, antenna port 14, $n_{SCID} = 1$ (OCC = 4) | 15 | 4 layers, antenna ports 11 to 14, $n_{SCID} = 0$ (OCC = 4) | 15 | 4 layers, antenna ports 11 to 14, $n_{SCID} = 1$ (OCC = 4); | and
the following table lists a third group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID} = 0$ (OCC = 4) | 0 | 1 layer, antenna port 7, $n_{SCID} = x$ (OCC = 4) | 0 | 2 layers, antenna ports 7 and 8, $n_{SCID} = 0$ (OCC = 4) |
| 1 | 1 layer, antenna port 7, $n_{SCID} = 1$ (OCC = 4) | 1 | 1 layer, antenna port 8, $n_{SCID} = x$ (OCC = 4) | 1 | 2 layers, antenna ports 7 and 8, $n_{SCID} = 1$ (OCC = 4) |
| 2 | 1 layer, antenna port 8, $n_{SCID} = 0$ (OCC = 4) | 2 | 1 layer, antenna port 11, $n_{SCID} = x$ (OCC = 4) | 2 | 2 layers, antenna ports 7 and 8, $n_{SCID} = x$ (OCC = 4) |
| 3 | 1 layer, antenna port 8, $n_{SCID} = 1$ (OCC = 4) | 3 | 1 layer, antenna port 13, $n_{SCID} = x$ (OCC = 4) | 3 | 2 layers, antenna ports 11 and 13, $n_{SCID} = 0$ (OCC = 4) |
| 4 | 1 layer, antenna port 11, $n_{SCID} = 0$ (OCC = 4) | 4 | 1 layer, antenna port 9, $n_{SCID} = x$ (OCC = 4) | 4 | 2 layers, antenna ports 11 and 13, $n_{SCID} = 1$ (OCC = 4) |
| 5 | 1 layer, antenna port 11, $n_{SCID} = 1$ (OCC = 4) | 5 | 1 layer, antenna port 10, $n_{SCID} = x$ (OCC = 4) | 5 | 2 layers, antenna ports 11 and 13, $n_{SCID} = x$ (OCC = 4) |
| 6 | 1 layer, antenna port 13, $n_{SCID} = 0$ (OCC = 4) | 6 | 1 layer, antenna port 12, $n_{SCID} = x$ (OCC = 4) | 6 | 2 layers, antenna ports 9 and 10, $n_{SCID} = 0$ (OCC = 4) |
| 7 | 1 layer, antenna port 13, $n_{SCID} = 1$ (OCC = 4) | 7 | 1 layer, antenna port 14, $n_{SCID} = x$ (OCC = 4) | 7 | 2 layers, antenna ports 9 and 10, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) | 8 | 2 layers, antenna ports 9 and 10, $n_{SCID} = x$ (OCC = 4) |
| 9 | 1 layer, antenna port 9, $n_{SCID} = 1$ (OCC = 4) | 9 | 2 layers, antenna ports 7 and 8, $n_{SCID} = 1$ (OCC = 4) | 9 | 2 layers, antenna ports 12 and 14, $n_{SCID} = 0$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) | 10 | 2 layers, antenna ports 12 and 14, $n_{SCID} = 1$ (OCC = 4) |
| 11 | 1 layer, antenna port 10, $n_{SCID} = 1$ (OCC = 4) | 11 | 2 layers, antenna ports 11 and 13, $n_{SCID} = 1$ (OCC = 4) | 11 | 2 layers, antenna ports 12 and 14, $n_{SCID} = x$ (OCC = 4) |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 3 layers, antenna ports 7 to 9 |
| 13 | 1 layer, antenna port 12, $n_{SCID} = 1$ (OCC = 4) | 13 | 3 layers, antenna ports 7 to 9, $n_{SCID} = 1$ (OCC = 4) | 13 | 4 layers, antenna ports 7 to 10 |
| 14 | 1 layer, antenna port 14, $n_{SCID} = 0$ (OCC = 4) | 14 | 3 layers, antenna ports 12 to 14, $n_{SCID} = 0$ (OCC = 4) | 14 | 5 layers, antenna ports 7 to 11 |
| 15 | 1 layer, antenna port 14, $n_{SCID} = 1$ (OCC = 4) | 15 | 3 layers, antenna ports 12 to 14, $n_{SCID} = 1$ (OCC = 4) | 15 | 6 layers, antenna ports 7 to 12. |

12. The reference signal configuration device according to claim 11, wherein the transmitter is further configured to:
sending radio resource control signaling, wherein the radio resource control signaling carries configuration result indication information, and the configuration result indication information is used to indicate that a current reference signal configuration switches between the first group of configuration results, the second group of configuration results, and the third group of configuration results.

13. A reference signal configuration device, comprising: a processor, a receiver, and a bus, wherein the processor and the receiver are connected by using the bus, to perform data transmission;
the receiver is configured to receive control signaling carrying reference signal configuration information indicating a configuration of a reference signal, wherein
the configuration information of the reference signal comprises a configuration mode field, the configuration mode field indicating a reference signal configuration mode through a redundancy version, and the configuration mode being one of the following two configuration modes: a first single-codeword transmission mode or a second single-codeword transmission mode, wherein the configuration mode field comprises at least one of a first new data indicator (NDI) or a second NDI, wherein
the first NDI is used to distinguish between the first single-codeword transmission mode and the second single-codeword transmission mode; or
the second NDI is used to distinguish between the first single-codeword transmission mode and the second single-codeword transmission mode; and
the processor is configured to process the control signaling.

14. The reference signal configuration device according to claim 13, wherein
the reference signal configuration information further comprises a configuration parameter field;
the configuration parameter field is used to indicate a state value of the reference signal; and the state value of the reference signal corresponds to at least one of a data transmission layer quantity, an antenna port, or a scrambling identity of the reference signal.

15. The reference signal configuration device according to claim 13, wherein
the configuration mode field further comprises a modulation and coding scheme (MCS) and a redundancy version (RV), when MCS=0 and RV=1, the configuration mode field indicates single-codeword transmission, when MCS≠0 or RV≠1, the configuration mode field indicates dual-codeword transmission, and the configuration mode is one of the following three configuration modes: a dual-codeword transmission mode, the first single-codeword transmission mode, or the second single-codeword transmission mode; and state values in the three configuration modes indicate a group of configuration results, and there are three groups of configuration results, wherein the following table lists a first group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID} = 0$ (OCC = 4) | 0 | 1 layer, antenna port 7, $n_{SCID} = 0$ (OCC = 4) | 0 | 2 layers, antenna ports 7 and 8, $n_{SCID} = 0$ (OCC = 4) |
| 1 | 1 layer, antenna port 7, $n_{SCID} = 1$ (OCC = 4) | 1 | 1 layer, antenna port 7, $n_{SCID} = 1$ (OCC = 4) | 1 | 2 layers, antenna ports 7 and 8, $n_{SCID} = 1$ (OCC = 4) |
| 2 | 1 layer, antenna port 8, $n_{SCID} = 0$ (OCC = 4) | 2 | 1 layer, antenna port 8, $n_{SCID} = 0$ (OCC = 4) | 2 | 2 layers, antenna ports 11 and 13, $n_{SCID} = 0$ (OCC = 4) |
| 3 | 1 layer, antenna port 8, $n_{SCID} = 1$ (OCC = 4) | 3 | 1 layer, antenna port 8, $n_{SCID} = 1$ (OCC = 4) | 3 | 2 layers, antenna ports 11 and 13, $n_{SCID} = 1$ (OCC = 4) |
| 4 | 1 layer, antenna port 11, $n_{SCID} = 0$ (OCC = 4) | 4 | 1 layer, antenna port 11, $n_{SCID} = 0$ (OCC = 4) | 4 | 2 layers, antenna ports 9 and 10, $n_{SCID} = 0$ (OCC = 4) |
| 5 | 1 layer, antenna port 11, $n_{SCID} = 1$ (OCC = 4) | 5 | 1 layer, antenna port 11, $n_{SCID} = 1$ (OCC = 4) | 5 | 2 layers, antenna ports 9 and 10, $n_{SCID} = 1$ (OCC = 4) |
| 6 | 1 layer, antenna port 13, $n_{SCID} = 0$ (OCC = 4) | 6 | 1 layer, antenna port 13, $n_{SCID} = 0$ (OCC = 4) | 6 | 2 layers, antenna ports 12 and 14, $n_{SCID} = 0$ (OCC = 4) |
| 7 | 1 layer, antenna port 13, $n_{SCID} = 1$ (OCC = 4) | 7 | 1 layer, antenna port 13, $n_{SCID} = 1$ (OCC = 4) | 7 | 2 layers, antenna ports 12 and 14, $n_{SCID} = 1$ (OCC = 4) |
| 8 | 1 layer, antenna port 9, $n_{SCID} = 0$ (OCC = 4) | 8 | 2 layers, antenna ports 7 and 8, $n_{SCID} = 0$ (OCC = 4) | 8 | 3 layers, antenna ports 7 to 9, $n_{SCID} = 0$ (OCC = 4) |
| 9 | 1 layer, antenna port 9, $n_{SCID} = 1$ (OCC = 4) | 9 | 2 layers, antenna ports 9 and 10, $n_{SCID} = 0$ (OCC = 4) | 9 | 3 layers, antenna ports 7 to 9, $n_{SCID} = 1$ (OCC = 4) |
| 10 | 1 layer, antenna port 10, $n_{SCID} = 0$ (OCC = 4) | 10 | 2 layers, antenna ports 11 and 13, $n_{SCID} = 0$ (OCC = 4) | 10 | 4 layers, antenna ports 7 to 10, $n_{SCID} = 0$ (OCC = 4) |
| 11 | 1 layer, antenna port 10, $n_{SCID} = 1$ (OCC = 4) | 11 | 2 layers, antenna ports 12 and 14, $n_{SCID} = 0$ (OCC = 4) | 11 | 4 layers, antenna ports 7 to 10, $n_{SCID} = 1$ (OCC = 4) |
| 12 | 1 layer, antenna port 12, $n_{SCID} = 0$ (OCC = 4) | 12 | 3 layers, antenna ports 7 to 9, $n_{SCID} = 0$ (OCC = 4) | 12 | 5 layers, antenna ports 7 to 11 |
| 13 | 1 layer, antenna port 12, $n_{SCID} = 1$ (OCC = 4) | 13 | 3 layers, antenna ports 12 to 14, $n_{SCID} = 0$ (OCC = 4) | 13 | 6 layers, antenna ports 7 to 12 |
| 14 | 1 layer, antenna port 14, $n_{SCID} = 0$ (OCC = 4) | 14 | 4 layers, antenna ports 7 to 10, $n_{SCID} = 0$ (OCC = 4) | 14 | 7 layers, antenna ports 7 to 13 |
| 15 | 1 layer, antenna port 14, $n_{SCID} = 1$ (OCC = 4) | 15 | 4 layers, antenna ports 11 to 14, $n_{SCID} = 0$ (OCC = 4) | 15 | 8 layers, antenna ports 7 to 14; | the following table lists a second group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID}$ = 0 (OCC = 4) | 0 | 1 layer, antenna port 7, $n_{SCID}$ = 0 (OCC = 4) | 0 | 2 layers, antenna ports 7 and 8, $n_{SCID}$ = 0 (OCC = 4) |
| 1 | 1 layer, antenna port 7, $n_{SCID}$ = 1 (OCC = 4) | 1 | 1 layer, antenna port 7, $n_{SCID}$ = 1 (OCC = 4) | 1 | 2 layers, antenna ports 7 and 8, $n_{SCID}$ = 1 (OCC = 4) |
| 2 | 1 layer, antenna port 8, $n_{SCID}$ = 0 (OCC = 4) | 2 | 1 layer, antenna port 8, $n_{SCID}$ = 0 (OCC = 4) | 2 | 2 layers, antenna ports 11 and 13, $n_{SCID}$ = 0 (OCC = 4) |
| 3 | 1 layer, antenna port 8, $n_{SCID}$ = 1 (OCC = 4) | 3 | 1 layer, antenna port 8, $n_{SCID}$ = 1 (OCC = 4) | 3 | 2 layers, antenna ports 11 and 13, $n_{SCID}$ = 1 (OCC = 4) |
| 4 | 1 layer, antenna port 11, $n_{SCID}$ = 0 (OCC = 4) | 4 | 1 layer, antenna port 11, $n_{SCID}$ = 0 (OCC = 4) | 4 | 2 layers, antenna ports 9 and 10, $n_{SCID}$ = 0 (OCC = 4) |
| 5 | 1 layer, antenna port 11, $n_{SCID}$ = 1 (OCC = 4) | 5 | 1 layer, antenna port 11, $n_{SCID}$ = 1 (OCC = 4) | 5 | 2 layers, antenna ports 9 and 10, $n_{SCID}$ = 1 (OCC = 4) |
| 6 | 1 layer, antenna port 13, $n_{SCID}$ = 0 (OCC = 4) | 6 | 1 layer, antenna port 13, $n_{SCID}$ = 0 (OCC = 4) | 6 | 2 layers, antenna ports 12 and 14, $n_{SCID}$ = 0 (OCC = 4) |
| 7 | 1 layer, antenna port 13, $n_{SCID}$ = 1 (OCC = 4) | 7 | 1 layer, antenna port 13, $n_{SCID}$ = 1 (OCC = 4) | 7 | 2 layers, antenna ports 12 and 14, $n_{SCID}$ = 1 (OCC = 4) |
| 8 | 1 layer, antenna port 9, $n_{SCID}$ = 0 (OCC = 4) | 8 | 2 layers, antenna ports 7 and 8, $n_{SCID}$ = 0 (OCC = 4) | 8 | 3 layers, antenna ports 7 to 9, $n_{SCID}$ = 0 (OCC = 4) |
| 9 | 1 layer, antenna port 9, $n_{SCID}$ = 1 (OCC = 4) | 9 | 2 layers, antenna ports 9 and 10, $n_{SCID}$ = 0 (OCC = 4) | 9 | 3 layers, antenna ports 7 to 9, $n_{SCID}$ = 1 (OCC = 4) |
| 10 | 1 layer, antenna port 10, $n_{SCID}$ = 0 (OCC = 4) | 10 | 2 layers, antenna ports 11 and 13, $n_{SCID}$ = 0 (OCC = 4) | 10 | 3 layers, antenna ports 12 to 14, $n_{SCID}$ = 0 (OCC = 4) |
| 11 | 1 layer, antenna port 10, $n_{SCID}$ = 1 (OCC = 4) | 11 | 2 layers, antenna ports 12 and 14, $n_{SCID}$ = 0 (OCC = 4) | 11 | 3 layers, antenna ports 12 to 14, $n_{SCID}$ = 1 (OCC = 4) |
| 12 | 1 layer, antenna port 12, $n_{SCID}$ = 0 (OCC = 4) | 12 | 3 layers, antenna ports 7 to 9, $n_{SCID}$ = 0 (OCC = 4) | 12 | 4 layers, antenna ports 7 to 10, $n_{SCID}$ = 0 (OCC = 4) |
| 13 | 1 layer, antenna port 12, $n_{SCID}$ = 1 (OCC = 4) | 13 | 3 layers, antenna ports 12 to 14, $n_{SCID}$ = 0 (OCC = 4) | 13 | 4 layers, antenna ports 7 to 10, $n_{SCID}$ = 1 (OCC = 4) |
| 14 | 1 layer, antenna port 14, $n_{SCID}$ = 0 (OCC = 4) | 14 | 4 layers, antenna ports 7 to 10, $n_{SCID}$ = 0 (OCC = 4) | 14 | 4 layers, antenna ports 11 to 14, $n_{SCID}$ = 0 (OCC = 4) |
| 15 | 1 layer, antenna port 14, $n_{SCID}$ = 1 (OCC = 4) | 15 | 4 layers, antenna ports 11 to 14, $n_{SCID}$ = 0 (OCC = 4) | 15 | 4 layers, antenna ports 11 to 14, $n_{SCID}$ = 1 (OCC = 4); | and the following table lists a third group of configuration results:

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 0 | 1 layer, antenna port 7, $n_{SCID}$ = 0 (OCC = 4) | 0 | 1 layer, antenna port 7, $n_{SCID}$ = x (OCC = 4) | 0 | 2 layers, antenna ports 7 and 8, $n_{SCID}$ = 0 (OCC = 4) |
| 1 | 1 layer, antenna port 7, $n_{SCID}$ = 1 (OCC = 4) | 1 | 1 layer, antenna port 8, $n_{SCID}$ = x (OCC = 4) | 1 | 2 layers, antenna ports 7 and 8, $n_{SCID}$ = 1 (OCC = 4) |
| 2 | 1 layer, antenna port 8, $n_{SCID}$ = 0 (OCC = 4) | 2 | 1 layer, antenna port 11, $n_{SCID}$ = x (OCC = 4) | 2 | 2 layers, antenna ports 7 and 8, $n_{SCID}$ = x (OCC = 4) |
| 3 | 1 layer, antenna port 8, $n_{SCID}$ = 1 (OCC = 4) | 3 | 1 layer, antenna port 13, $n_{SCID}$ = x (OCC = 4) | 3 | 2 layers, antenna ports 11 and 13, $n_{SCID}$ = 0 (OCC = 4) |
| 4 | 1 layer, antenna port 11, $n_{SCID}$ = 0 (OCC = 4) | 4 | 1 layer, antenna port 9, $n_{SCID}$ = x (OCC = 4) | 4 | 2 layers, antenna ports 11 and 13, $n_{SCID}$ = 1 (OCC = 4) |
| 5 | 1 layer, antenna port 11, $n_{SCID}$ = 1 (OCC = 4) | 5 | 1 layer, antenna port 10, $n_{SCID}$ = x (OCC = 4) | 5 | 2 layers, antenna ports 11 and 13, $n_{SCID}$ = x (OCC = 4) |

-continued

| Single-codeword transmission for new-data transmission (MCS = 0, RV = 1, NDI1 = 1) | | Single-codeword transmission for retransmission (MCS = 0, RV = 1, NDI1 = 0) | | Dual-codeword transmission | |
|---|---|---|---|---|---|
| State value | Meaning | State value | Meaning | State value | Meaning |
| 6 | 1 layer, antenna port 13, $n_{SCID}$ = 0 (OCC = 4) | 6 | 1 layer, antenna port 12, $n_{SCID}$ = x (OCC = 4) | 6 | 2 layers, antenna ports 9 and 10, $n_{SCID}$ = 0 (OCC = 4) |
| 7 | 1 layer, antenna port 13, $n_{SCID}$ = 1 (OCC = 4) | 7 | 1 layer, antenna port 14, $n_{SCID}$ = x (OCC = 4) | 7 | 2 layers, antenna ports 9 and 10, $n_{SCID}$ = 1 (OCC = 4) |
| 8 | 1 layer, antenna port 9, $n_{SCID}$ = 0 (OCC = 4) | 8 | 2 layers, antenna ports 7 and 8, $n_{SCID}$ = 0 (OCC = 4) | 8 | 2 layers, antenna ports 9 and 10, $n_{SCID}$ = x (OCC = 4) |
| 9 | 1 layer, antenna port 9, $n_{SCID}$ = 1 (OCC = 4) | 9 | 2 layers, antenna ports 7 and 8, $n_{SCID}$ = 1 (OCC = 4) | 9 | 2 layers, antenna ports 12 and 14, $n_{SCID}$ = 0 (OCC = 4) |
| 10 | 1 layer, antenna port 10, $n_{SCID}$ = 0 (OCC = 4) | 10 | 2 layers, antenna ports 11 and 13, $n_{SCID}$ = 0 (OCC = 4) | 10 | 2 layers, antenna ports 12 and 14, $n_{SCID}$ = 1 (OCC = 4) |
| 11 | 1 layer, antenna port 10, $n_{SCID}$ = 1 (OCC = 4) | 11 | 2 layers, antenna ports 11 and 13, $n_{SCID}$ = 1 (OCC = 4) | 11 | 2 layers, antenna ports 12 and 14, $n_{SCID}$ = x (OCC = 4) |
| 12 | 1 layer, antenna port 12, $n_{SCID}$ = 0 (OCC = 4) | 12 | 3 layers, antenna ports 7 to 9, $n_{SCID}$ = 0 (OCC = 4) | 12 | 3 layers, antenna ports 7 to 9 |
| 13 | 1 layer, antenna port 12, $n_{SCID}$ = 1 (OCC = 4) | 13 | 3 layers, antenna ports 7 to 9, $n_{SCID}$ = 1 (OCC = 4) | 13 | 4 layers, antenna ports 7 to 10 |
| 14 | 1 layer, antenna port 14, $n_{SCID}$ = 0 (OCC = 4) | 14 | 3 layers, antenna ports 12 to 14, $n_{SCID}$ = 0 (OCC = 4) | 14 | 5 layers, antenna ports 7 to 11 |
| 15 | 1 layer, antenna port 14, $n_{SCID}$ = 1 (OCC = 4) | 15 | 3 layers, antenna ports 12 to 14, $n_{SCID}$ = 1 (OCC = 4) | 15 | 6 layers, antenna ports 7 to 12, | wherein

NDI1 indicates the first NDI, NDI2 indicates the second NDI, $n_{SCID}$ indicates an initial value code of a scrambling identity, and OCC indicates an orthogonal cover code.

16. The reference signal configuration device according to claim 15, wherein the receiver is further configured to:

receiving radio resource control signaling, wherein the radio resource control signaling carries configuration result indication information, and the configuration result indication information is used to indicate that a current reference signal configuration switches between the first group of configuration results, the second group of configuration results, and the third group of configuration results.

\* \* \* \* \*